(12) United States Patent
Plotkin

(10) Patent No.: US 9,094,352 B2
(45) Date of Patent: *Jul. 28, 2015

(54) ENFORCED UNITASKING IN MULTITASKING SYSTEMS

(71) Applicant: Yagi Corp., Concord, MA (US)

(72) Inventor: Robert Plotkin, Concord, MA (US)

(73) Assignee: Yagi Corp., Barre, MA (US)

( * ) Notice: Subject to any disclaimer, the term of this patent is extended or adjusted under 35 U.S.C. 154(b) by 122 days.

This patent is subject to a terminal disclaimer.

(21) Appl. No.: 14/047,208

(22) Filed: Oct. 7, 2013

(65) Prior Publication Data

US 2014/0040399 A1 Feb. 6, 2014

Related U.S. Application Data

(63) Continuation of application No. 13/292,032, filed on Nov. 8, 2011, now Pat. No. 8,554,856, and a continuation-in-part of application No. 13/244,206, filed on Sep. 23, 2011.

(60) Provisional application No. 61/411,068, filed on Nov. 8, 2010, provisional application No. 61/386,030, filed on Sep. 24, 2010.

(51) Int. Cl.
*H04L 12/58* (2006.01)
*G06F 9/48* (2006.01)

(52) U.S. Cl.
CPC .............. *H04L 51/00* (2013.01); *G06F 9/4843* (2013.01); *H04L 51/04* (2013.01)

(58) Field of Classification Search
CPC ... H04L 67/24; H04L 12/581; H04L 12/5815; H04L 12/587; H04L 67/306; H04L 12/5855; H04L 51/36; H04L 51/14; G06Q 10/107; G06Q 10/10; G06Q 10/06; G06Q 10/109; G06Q 10/06311; H04M 1/72552
See application file for complete search history.

(56) References Cited

U.S. PATENT DOCUMENTS

| | | | |
|---|---|---|---|
| 6,400,810 B1 | 6/2002 | Skladman | |
| 6,415,026 B1* | 7/2002 | Flood | 379/215.01 |
| 6,757,897 B1* | 6/2004 | Shi et al. | 718/102 |
| 6,883,017 B1* | 4/2005 | Ujigawa et al. | 709/203 |
| 7,143,356 B1* | 11/2006 | Shafrir et al. | 715/751 |
| 7,263,545 B2* | 8/2007 | Digate et al. | 709/206 |
| 7,444,383 B2* | 10/2008 | Horvitz | 709/207 |
| 7,568,001 B2* | 7/2009 | McPartlan et al. | 709/202 |
| 7,886,232 B2* | 2/2011 | Fish | 715/741 |
| 7,945,612 B2* | 5/2011 | Raghav et al. | 709/201 |
| 8,370,756 B2* | 2/2013 | Malik et al. | 715/752 |
| 8,532,069 B2 | 9/2013 | Balwani | |
| 2002/0002590 A1* | 1/2002 | King et al. | 709/206 |
| 2002/0194331 A1* | 12/2002 | Lewis et al. | 709/224 |
| 2003/0046421 A1 | 3/2003 | Horvitz | |
| 2003/0126216 A1* | 7/2003 | Avila et al. | 709/206 |

(Continued)

*Primary Examiner* — Backhean Tiv
(74) *Attorney, Agent, or Firm* — Robert Plotkin, P.C.

(57) ABSTRACT

A computer system includes one or more devices that are capable of multitasking (performing at least two tasks in parallel or substantially in parallel). In response to detecting that one of the devices is performing a first one of the tasks, the system prevents the devices from performing at least one of the tasks other than the first task (such as all of the tasks other than the first task). In response to detecting that one of the devices is performing a second one of the tasks, the system prevents the devices from performing at least one of the tasks other than the second task (such as all of the tasks other than the first task).

26 Claims, 23 Drawing Sheets

(56) References Cited

U.S. PATENT DOCUMENTS

| | | | |
|---|---|---|---|
| 2004/0078795 A1* | 4/2004 | Alverson et al. | 718/100 |
| 2004/0146144 A1* | 7/2004 | Gao et al. | 379/88.12 |
| 2005/0198545 A1* | 9/2005 | Wieck et al. | 713/323 |
| 2005/0283785 A1* | 12/2005 | D'Souza | 718/100 |
| 2006/0036688 A1* | 2/2006 | McMahan et al. | 709/206 |
| 2006/0040643 A1* | 2/2006 | O'Connor | 455/412.1 |
| 2006/0189301 A1* | 8/2006 | Vander Veen et al. | 455/414.1 |
| 2006/0210034 A1* | 9/2006 | Beadle et al. | 379/88.22 |
| 2006/0211443 A1* | 9/2006 | Wegman | 455/550.1 |
| 2006/0248183 A1* | 11/2006 | Barton | 709/224 |
| 2007/0011367 A1* | 1/2007 | Scott et al. | 710/48 |
| 2007/0016867 A1* | 1/2007 | Nickell et al. | 715/730 |
| 2007/0117558 A1 | 5/2007 | Balwani | |
| 2007/0179953 A1* | 8/2007 | Mahoney et al. | 707/9 |
| 2007/0207727 A1* | 9/2007 | Song et al. | 455/3.06 |
| 2007/0239869 A1* | 10/2007 | Raghav et al. | 709/224 |
| 2007/0263659 A1* | 11/2007 | Wang | 370/468 |
| 2008/0040485 A1* | 2/2008 | Glasgow | 709/227 |
| 2008/0085687 A1* | 4/2008 | Brekke et al. | 455/187.1 |
| 2008/0104169 A1 | 5/2008 | Combel | |
| 2008/0139199 A1* | 6/2008 | Plestid | 455/426.1 |
| 2008/0159522 A1 | 7/2008 | Ericson | |
| 2008/0184267 A1 | 7/2008 | Hochmuth | |
| 2008/0207263 A1 | 8/2008 | May | |
| 2008/0208984 A1 | 8/2008 | Rosenberg | |
| 2008/0274694 A1* | 11/2008 | Castell et al. | 455/26.1 |
| 2008/0304634 A1 | 12/2008 | Gao | |
| 2009/0036148 A1* | 2/2009 | Yach | 455/457 |
| 2009/0037569 A1* | 2/2009 | O'Loughlin et al. | 709/224 |
| 2009/0083742 A1 | 3/2009 | Ramanathan | |
| 2009/0089381 A1* | 4/2009 | Anderson et al. | 709/206 |
| 2009/0112996 A1* | 4/2009 | Baker et al. | 709/206 |
| 2010/0159995 A1* | 6/2010 | Stallings et al. | 455/566 |
| 2010/0227600 A1 | 9/2010 | VanderVeen | |
| 2010/0303220 A1* | 12/2010 | Brooks et al. | 379/142.05 |
| 2010/0316207 A1* | 12/2010 | Brunson | 379/202.01 |
| 2011/0009107 A1 | 1/2011 | Guba | |
| 2011/0093542 A1* | 4/2011 | Lau et al. | 709/206 |
| 2011/0117886 A1 | 5/2011 | Travis | |
| 2011/0153753 A1* | 6/2011 | Childress et al. | 709/206 |
| 2011/0301996 A1* | 12/2011 | Johnson et al. | 705/7.26 |
| 2012/0021717 A1 | 1/2012 | Schmidt | |
| 2012/0083260 A1 | 4/2012 | Arriola | |
| 2012/0117489 A1* | 5/2012 | Bank et al. | 715/753 |
| 2012/0315880 A1* | 12/2012 | Peitrow et al. | 455/412.1 |
| 2013/0005361 A1* | 1/2013 | Fish | 455/456.3 |
| 2013/0122878 A1 | 5/2013 | Selph | |

* cited by examiner

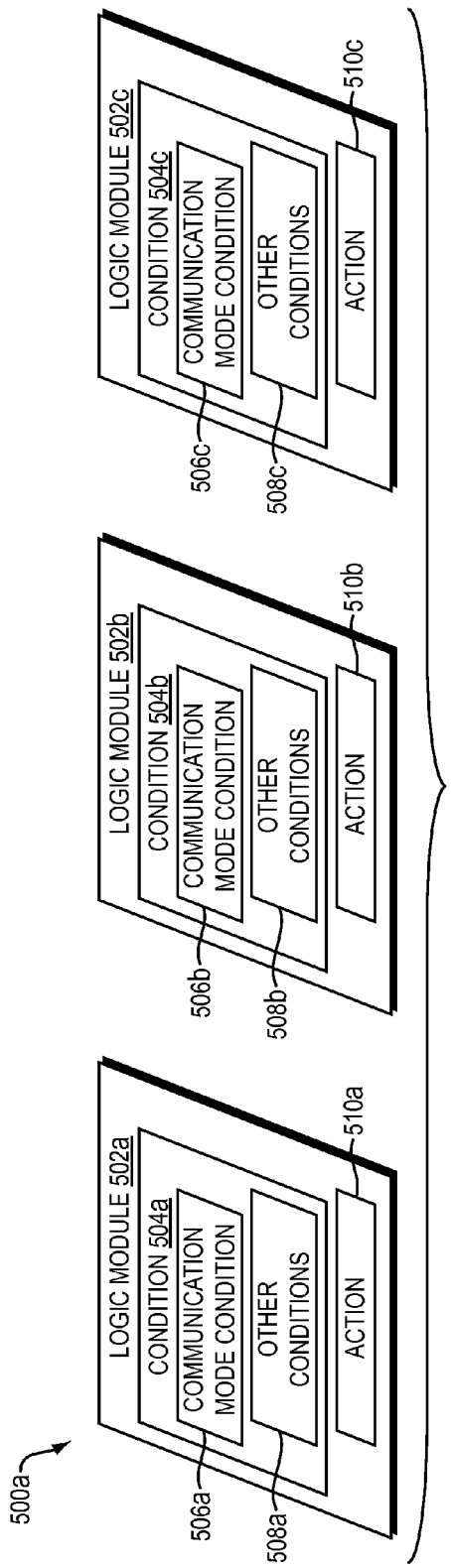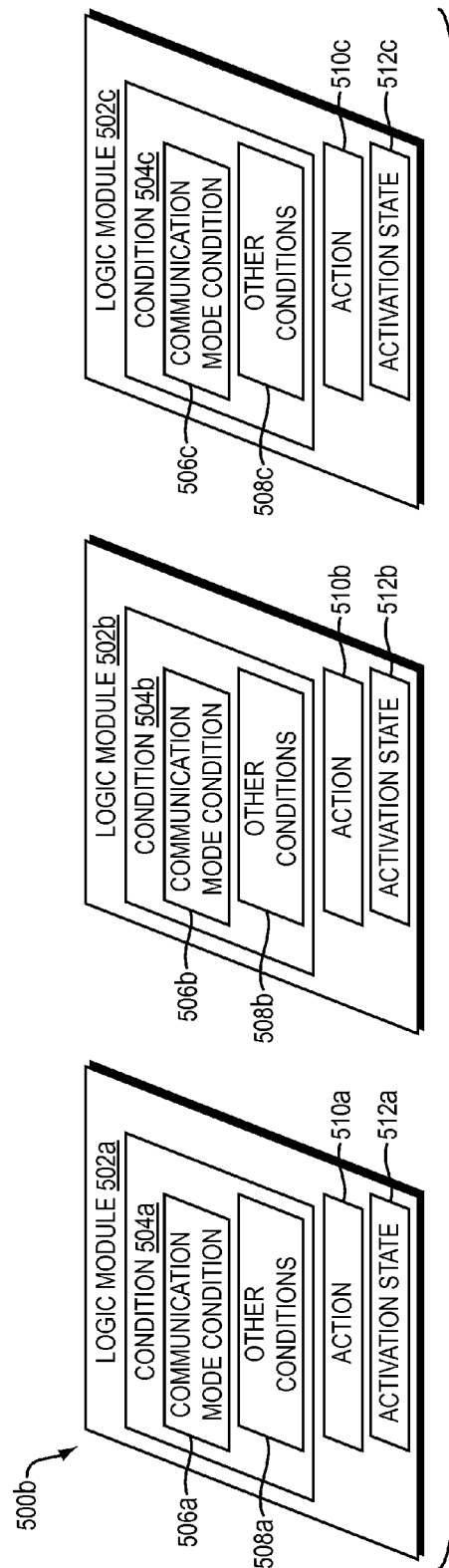

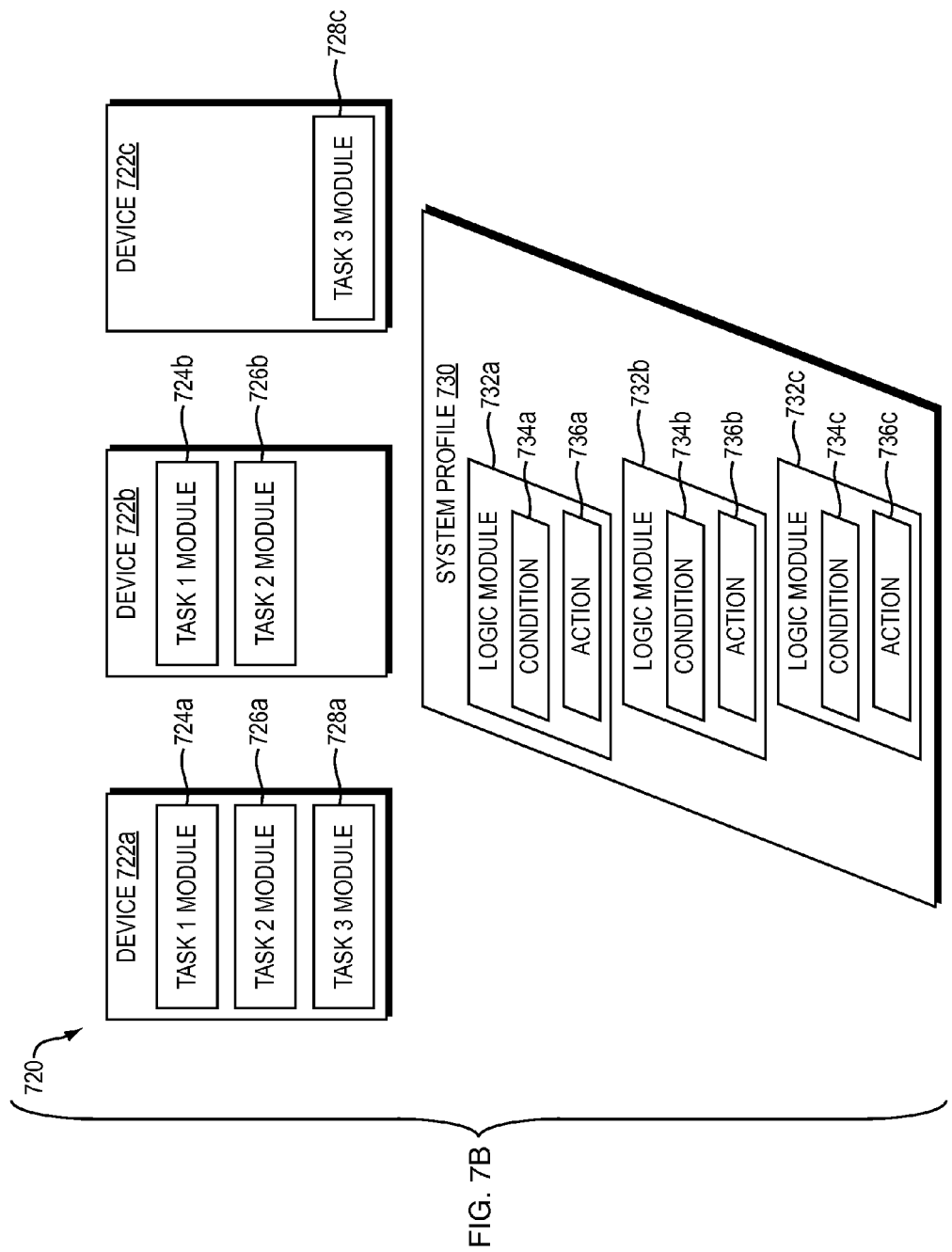

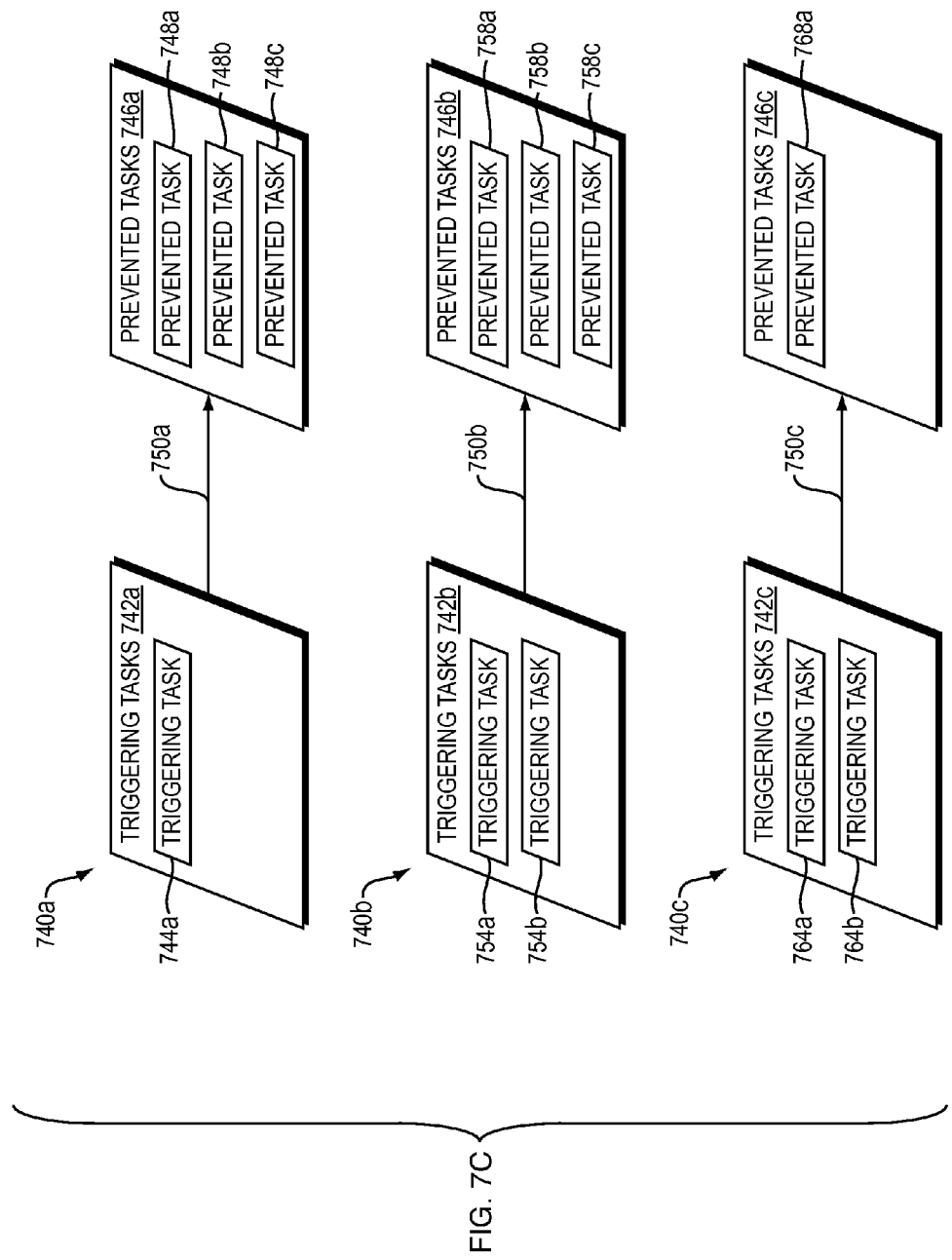

ENFORCED UNITASKING IN MULTITASKING SYSTEMS

BACKGROUND

Today's computer users are faced with a continuous barrage of incoming information in the form of email messages, text messages, voice messages and live voice calls, and messages transmitted via social networking systems, to name a few. Similarly, users are expected and sometimes required to create and transmit an equally high volume of outgoing messages as part of their work and social commitments. Such a constant stream of communication can make it difficult for computer users to concentrate on tasks requiring deep, sustained thought while using computers.

Although many recognize the potential harm of increasingly distracted computer and Internet use, as evidenced by pejorative terms such as "Crackberry addict" to describe someone who compulsively sends and receives email using a Blackberry mobile computing device, the blame for such harms typically is laid at the feet of the computer user for failing to exercise sufficient self-control. The solution most commonly proposed to this problem is for computer users to unilaterally change their usage habits, such as by leaving their computers at home while on vacation or manually turning off their smartphones while in restaurants.

SUMMARY

A computer system includes one or more devices that are capable of multitasking (performing at least two tasks in parallel or substantially in parallel). In response to detecting that one of the devices is performing a first one of the tasks, the system prevents the devices from performing at least one of the tasks other than the first task (such as all of the tasks other than the first task). In response to detecting that one of the devices is performing a second one of the tasks, the system prevents the devices from performing at least one of the tasks other than the second task (such as all of the tasks other than the first task).

BRIEF DESCRIPTION OF THE DRAWINGS

FIGS. 5A-5D are diagrams illustrating the use of activation states with profiles and logic modules according to embodiments of the present invention;

FIG. 7B is a diagram illustrating use of an embodiment of the present invention to enforce unitasking among one or more devices according to one embodiment of the present invention;

FIG. 7C is a diagram illustrating a plurality of unitasking specifiers according to one embodiment of the present invention;

DETAILED DESCRIPTION

Figure 1A:
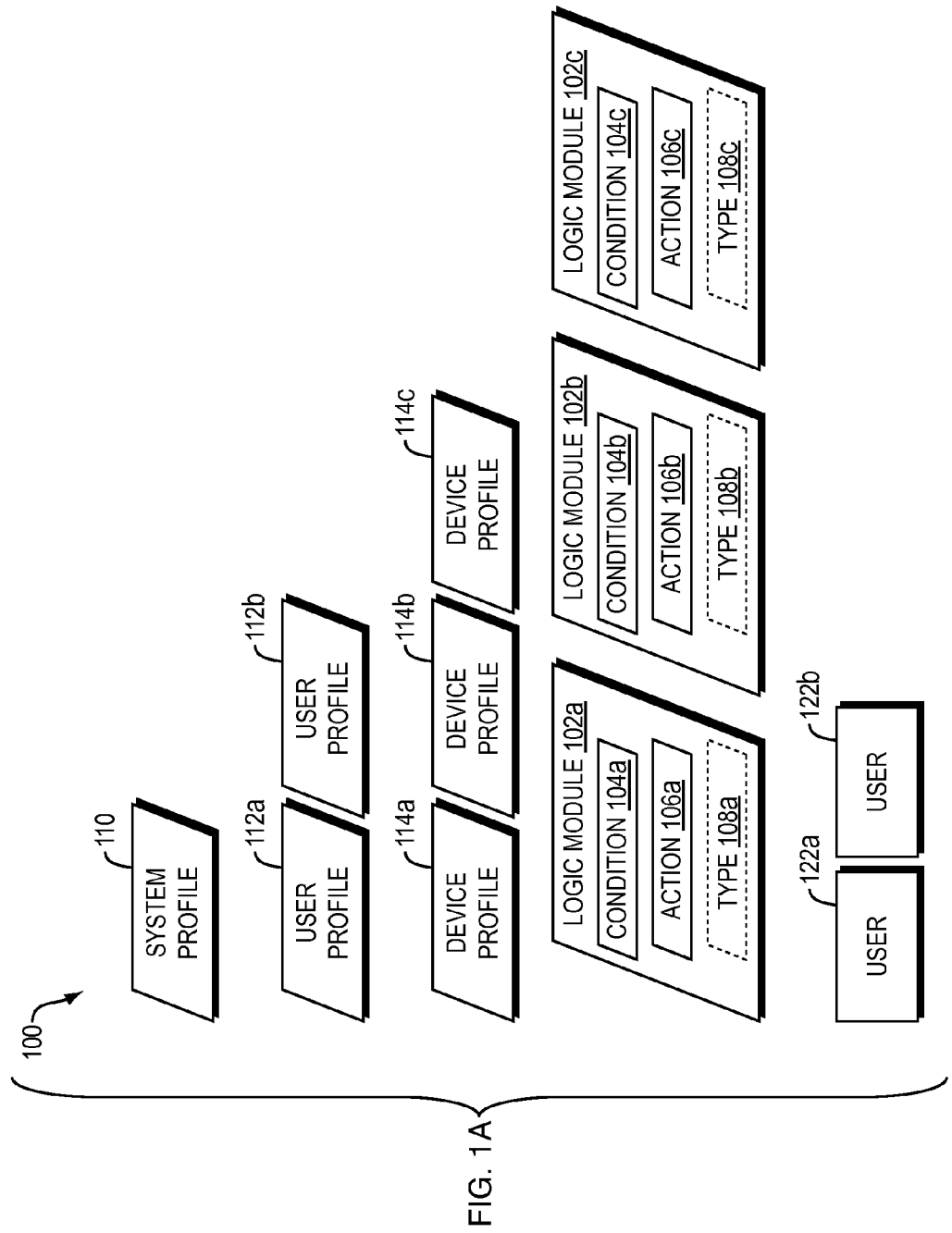
FIG. 1A is a dataflow diagram of a computer control system according to one embodiment of the present invention.

Referring to FIG. 1A, a dataflow diagram is shown of a computer control system 100 implemented according to one embodiment of the present invention. In general, the system 100 includes one or more profiles that define actions to be taken by the system 100 in response to satisfaction of conditions defined by the profiles. As will be described in more detail below, such conditions and actions may be defined in ways that control the extent to which users of the system 100 are distracted by devices within the system 100 and by other devices used by such users.

The system 100 includes one or more logic modules 102a-c. Although three logic modules 102a-c are shown in FIG. 1A as an example, the system 100 may include any number of logic modules. In general, each of the logic modules 102a-c defines a condition and a corresponding action. As will be described in more detail below, the system 100 or other embodiment of the present invention may perform the action defined by a logic module if the condition defined by the logic module is satisfied by the current context of the system 100. For example, logic module 102a includes condition specifier 104a (which specifies a first condition) and action specifier 106a (which specifies a first action); logic module 102b includes condition specifier 104b (which specifies a second condition) and action specifier 106b (which specifies a second action); and logic module 102c includes condition specifier 104c (which specifies a third condition) and action 106c (which specifies a third action).

The condition and action specified by a particular logic module may implement a rule, such that the system 100 necessarily performs the action in response to determining that the condition is satisfied. Logic modules 102a-c need not, however, implement rules. Alternatively, for example, logic modules 102a-c may implement statistical methods such that the action specified by a logic module may or may not be performed in response to detecting that the condition specified by the logic module is satisfied in a particular instance. For example, a logic module may be implemented such that the action specified by the logic module is performed with a likelihood of 50% in response to determining that the condition specified by the logic module is satisfied, with the decision in a particular instance being implemented using a pseudo-random number generator. Various examples disclosed herein, however, will describe logic modules 102a-c as implementing rules for ease of explanation.

Each of condition specifiers 104a-c may specify a simple condition, such as a condition including only a single premise, such as "TIME=11:00," or a complex condition including a plurality of premises joined by one or more Boolean operators (e.g., AND, OR, XOR, NOT) in any combination. Therefore, any reference herein to a "condition" includes simple conditions and/or complex conditions. More generally, a condition may be implemented using any process that produces an output (e.g., a binary output) to determine whether to perform the corresponding action.

Similarly, each of actions 106a-b may specify a simple action, such as an action to block receipt of an email message, or a complex action including a plurality of actions. Therefore, any reference herein to an "action" refers includes simple actions and/or complex actions. More generally, an action may be implemented using any process.

An action specifier may specify an action at any level of generality. For example, an action specifier may specify a particular action to be performed by the hardware of a device. As another example, an action specifier may specify a type of action, such as "block." In such a case, the specified action may be performed by identifying one or more specific acts that implement the specified action, and by performing the one or more specific acts. For example, a "block" action may be performed by performing a first set of acts to block an incoming email message, by performing a second set of acts to block an outgoing email message, and a third set of acts to block an incoming voice call, where the first, second, and third sets of acts differ from each other. The particular act(s) to perform in a particular instance to implement the "block" action may be determined dynamically and on-the-fly.

More generally, an action specifier may specify an action that is defined by any process, function, algorithm, or other set of acts. For example, an action specifier may specify a process which, when performed, receives input from some or all of the context data described below. As a result, the acts performed when executing a particular action specifier may vary from case to case depending on the current context data.

Any two of the condition specifiers 104a-c may specify the same or different conditions from each other. Similarly, any two of the action specifiers 106a-c may specify the same or different actions from each other. For example, no two of the condition specifiers 104a-c may specify the same condition as each other. As another example, condition specifiers 104a and 104b may specify the same conditions as each other, but condition specifier 104c may specify a condition that differs from the conditions specified by condition specifier 104a and condition specifier 104b. Similarly, for example, no two of the action specifiers 106a-c may specify actions that are the same as each other. As another example, action specifiers 106a and 104bb may specify the same actions as each other, but action specifier 106c may specify an action that differs from the actions specified by both action specifier 106a and action specifier 106b.

The system 100 also includes various profiles. In general, the term "profile" is used herein to refer to any set of data, such as a set of data that includes parameters, where each parameter has both a type and a value. For example, one parameter may have a type of "time" and a value that represents the current time (e.g., 11:00).

The system 100 includes, for example, one or more system profiles. In general, a system profile includes data representing information related to the system 100 as a whole. A single system profile 110 is shown in FIG. 1A. The system 100 may, however, include more than one system profile.

The system 100 also includes, for example, one or more user profiles. In general, a user profile includes data representing information related to a particular human user. In the example of FIG. 1A, the system 100 includes two user profiles 112a and 112b, which include data representing information related to users 122a and 122b, respectively. The system 100 may, however, include any number of user profiles.

The system 100 also includes, for example, one or more device profiles. In general, a device profile includes data representing information related to a particular device, such as a computing device or a communication device. In the example of FIG. 1A, the system 100 includes three device profiles 114a-c, which include data representing information related to devices 124a-c, respectively. The system 100 may, however, include any number of device profiles.

The system 100 need not include all of the types of profiles shown in FIG. 1A, where examples of profile types are system, user, and device. Rather, for example, the system 100 may solely include one or more profiles of a single type. For example, the system 100 may solely include a system profile, or solely include a user profile, or solely include a device profile. More generally, the system 100 may include one or more profiles of each of one or more of the types shown in FIG. 1A, so that the system 100 includes at least one profile of at least one type.

Figure 1B:
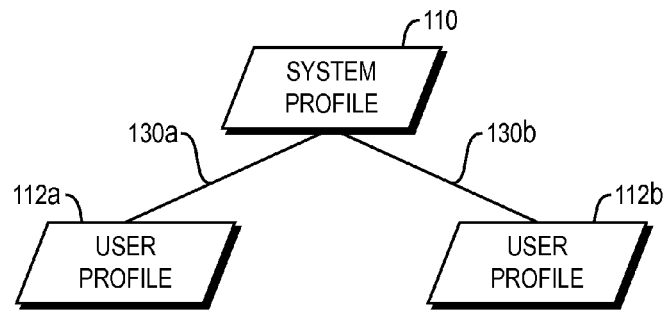
FIGS. 1B-1D are diagrams illustrating profiles and relationships among profiles according to embodiments of the present invention.

Profiles may be associated with each other in various ways. For example, a system profile may be associated with one or more user profiles. Referring to FIG. 1B, an example is shown in which system profile 110 is associated with user profiles 112a and 112b, as indicated by associations 130a and 130b, respectively. Although in the example of FIG. 1B the system profile 110 is associated with all of the user profiles 112a-b in the system 100, this is not required; the system profile 110 may alternatively be associated with fewer than all of the user profiles 112a-b in the system 100.

Figure 1C:
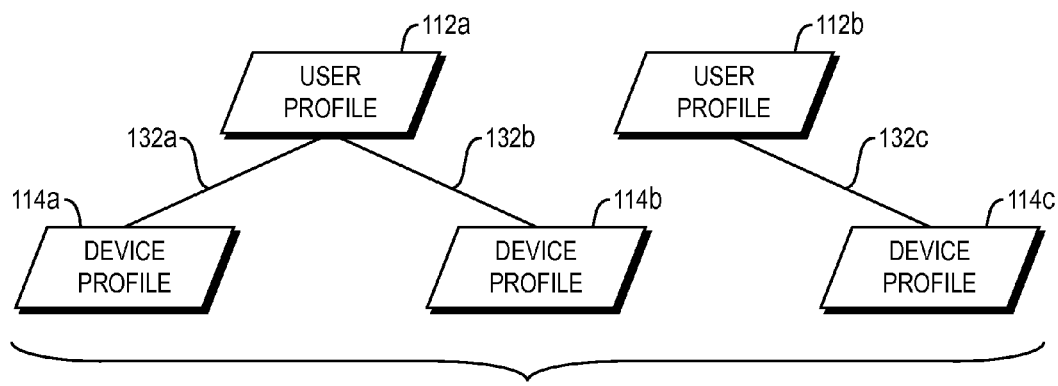

Referring to FIG. 1C, an example is shown in which: (1) user profile 112a is associated with device profiles 114a and 114b, as indicated by associations 132a and 132b, respectively; and (2) user profile 112b is associated with device profile 114c, as indicated by association 132c. As these examples illustrate, a user profile may be associated with any number of device profiles. Furthermore, although not shown in FIG. 1C, two user profiles may be associated with the same device profile. For example, this would occur in FIG. 1C if the user profile 112b were additionally associated with device profile 114b.

Figure 1D:
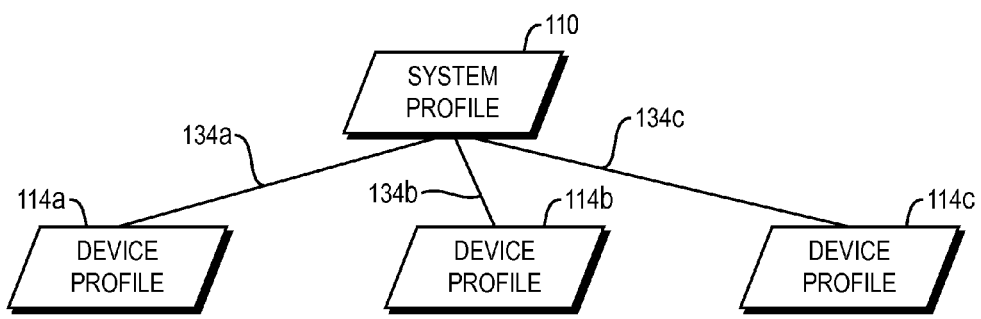

Referring to FIG. 1D, an example is shown in which system profile 110 is associated with device profiles 114a-c, as indicated by associations 134a-c, respectively. Although in the example of FIG. 1D the system profile 110 is associated with all of the device profiles 114a-c in the system 100, this is not required; the system profile 110 may alternatively be associated with fewer than all of the device profiles 114a-b in the system 100.

Any profile of any type may be associated with more or more logic modules. For example, referring to FIG. 1E, an example is shown in which system profile 110 is associated with logic module 102a (as indicated by association 136a); user profile 112a is associated with logic module 102a (as indicated by association 136b) and logic module 102b (as indicated by association 136c); user profile 112b is associated with logic module 102c (as indicated by association 136d); device profile 114a is associated with logic module 102a (as indicated by association 136e); device profile 114b is associated with logic module 102a (as indicated by association 136f) and logic module 102c (as indicated by association 136g); and device profile 114c is not associated with any logic module.

Figure 1E:
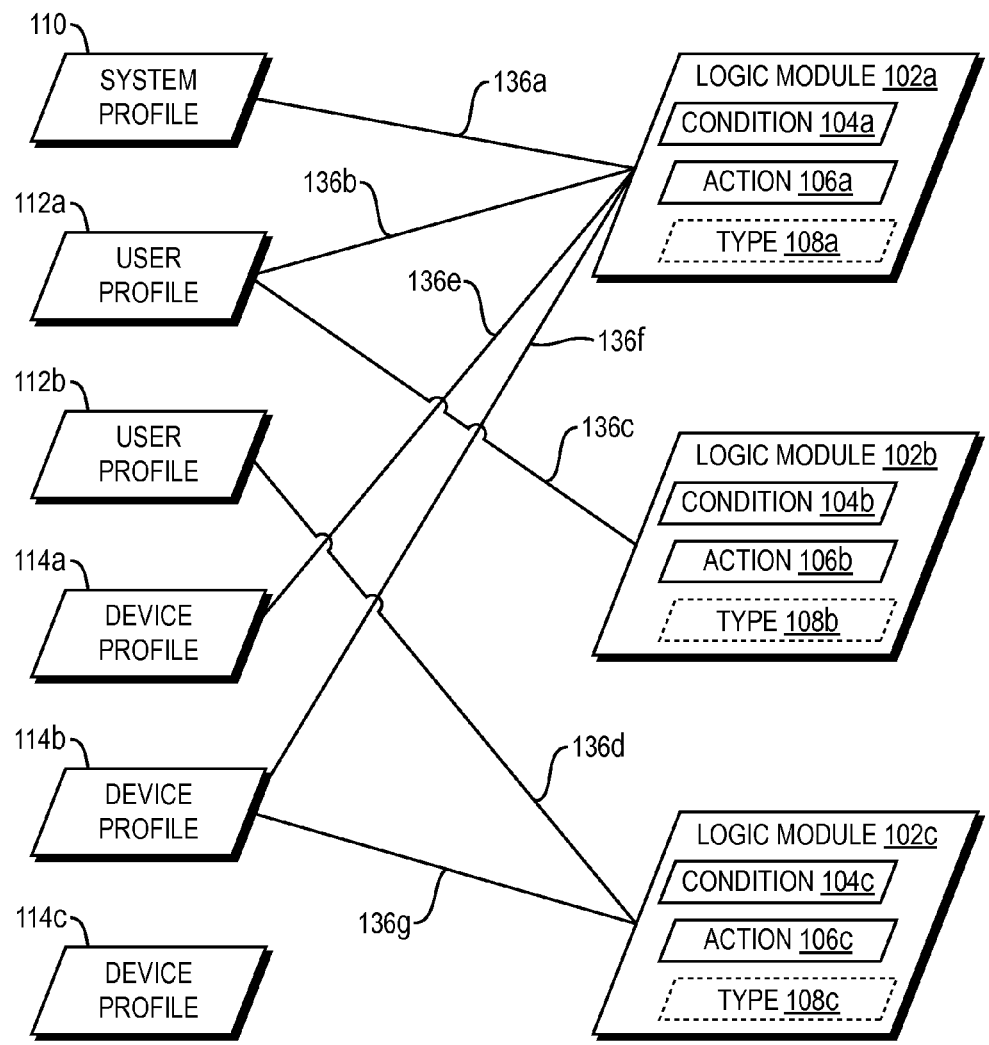
FIG. 1E is a diagram illustrating relationships between profiles and logic modules according to one embodiment of the present invention.

As illustrated in FIG. 1E, any profile of any type may be associated with any number (i.e., zero or more) of logic modules. One logic module may be associated with multiple profiles, e.g., multiple profiles of the same type or of different types. Furthermore, although in the example of FIG. 1E at least one profile of each type (system, user, and device) is associated with at least one logic module, this is not a requirement. Instead, for example, the system profile 110 may not be associated with any of the logic modules 102a-c. As another example, neither of the user modules 112a-b may be associated with any of the logic modules 102a-c. As yet another example, none of the device modules 114a-c may be associated with any of the logic modules 102a-c. All that is required is that at least one profile in the system 100 be associated with at least one of the logic modules 102a-c.

Figure 2:
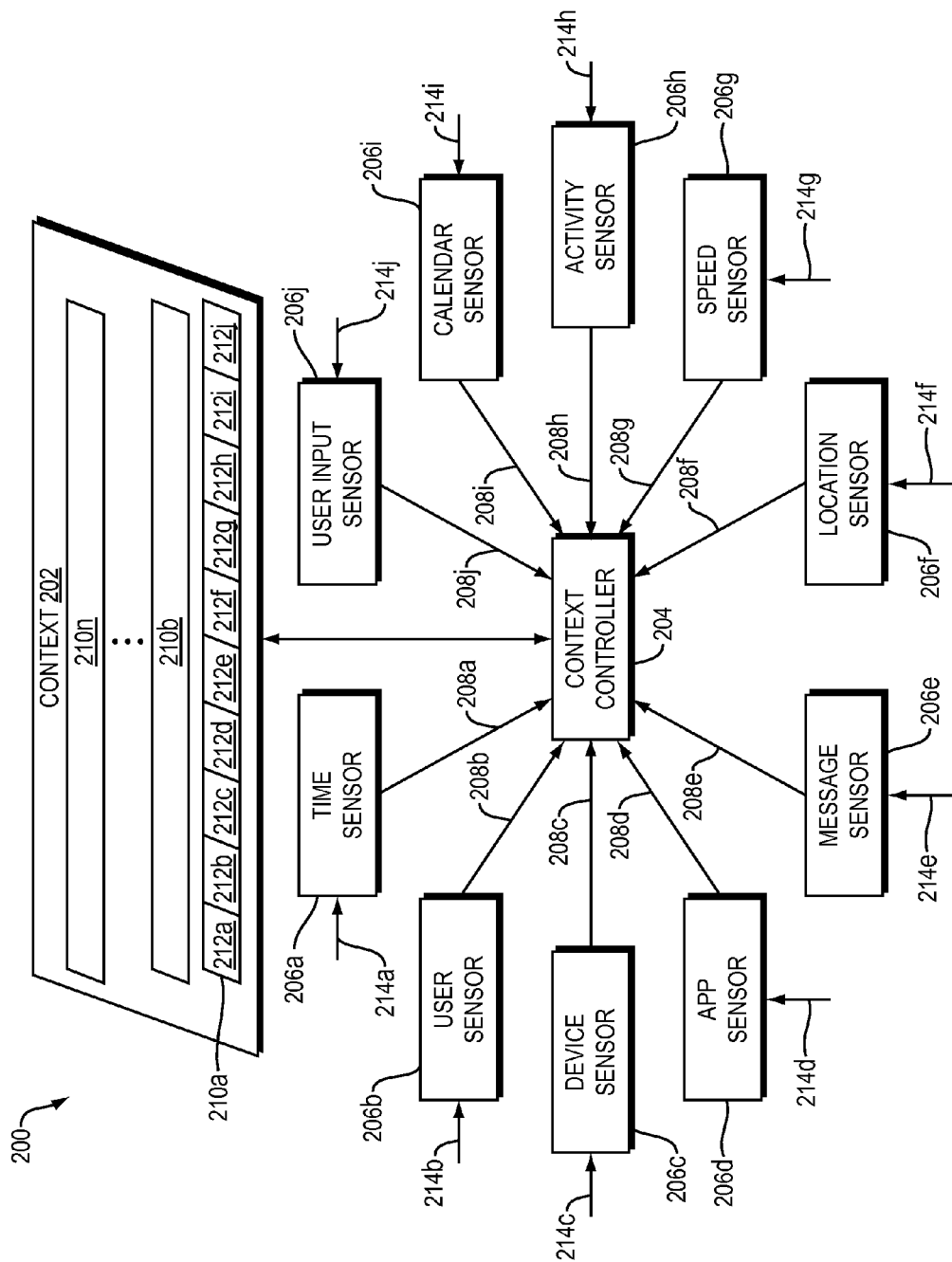
FIG. 2 is a diagram of a context controller for obtaining and synthesizing context data according to one embodiment of the present invention.

Referring to FIG. 2, a dataflow diagram is shown of a system 200 for obtaining and storing context data 202. Context data 202 is also referred to herein as "context." Context data 202 may, for example, represent information about an activity currently engaged in by one of the users 122a-b of the system 100, information about appointments on a user's calendar, or information about messages currently being transmitted by the system 100.

The system 200 includes a plurality of context sensors 206a-j. In general context sensors 206a-j obtain sensor inputs 214a-j, respectively, and generate outputs 208a-j, respectively. The outputs 208a-j of context sensors 206a-j are provided to and received by context controller 204, which generates and stores context data 202 based on the received outputs 208a-j. Context data 202 may, for example, include a context data record 210a, which includes fields 212a-j corresponding to and representing sensor outputs 208a-j, respectively. More specifically, field 212a may represent sensor output 208a, field 212b may represent sensor output 208b, and so on.

Although not shown in FIG. 2, context controller may be used to read the context data 202. For example, context controller 204 may provide output representing some or all of context data 202, e.g., in response to a request from another component for such data. Furthermore, context controller 204 may receive a request from another component to modify some or all of context data 202 and, in response to such a request, may make the requested modification to the context data 202.

Context controller 204 may sample the outputs 208a-j repeatedly, e.g., periodically (e.g., every millisecond, every second, or every minute), or in response to detecting a change in one or more of the outputs 208a-j. The context controller 204 may generate and store multiple context data records 210a-n, each of which represents a distinct sample of some or all of the sensor outputs 208a-j. Such repeated sampling and storage may, for example, be used to store a record of the history of context data generated by the context controller 204 within the context data 202 itself. Alternatively, for example, the context controller 204 may store only a single context data record 212a within the context data 202, and overwrite the values in the context data record 212a based on the outputs 208a-j received most recently from the sensors 206a-j.

Each of the sensors 206a-j may provide, as its output, an output that is identical to or a copy of the sensor's input, or an output that is generated based on the sensor's input but which differs from the sensor's input in any of a variety of ways, such as in its format and/or value. Furthermore, inputs 214a-j are optional; they may be omitted from the system 200 or integrated into their corresponding sensors. Any one or more of the sensors 206a-j may receive multiple inputs and derive output from such multiple inputs in any way.

Sensor 206a is a time sensor, which receives time sensor input 214a, such as data generated by a clock representing a current time. Time sensor 206a may, for example, generate output 208a representing a current time (e.g., the time at or around the time at which the sensor output 208a is generated). Such a time may be any kind of time, such as a real time (e.g., Jan. 1, 2011 at 11:00 AM) or a system time (e.g., a number of clock cycles since a device was booted), represented to any degree of accuracy.

Storing a value that is equal to or based on the time sensor output 208a in the context records 210a-n effectively marks such records with timestamps that may later be used to associate any particular record with the time stored in the record's time field 212a, which may represent the actual or approximate time at which the record was created. The context controller 204 may sample all of the sensor outputs 208a-j at or near the time represented by the time sensor output 208a and generate a corresponding context record based on such sampled outputs, so that each of the context records 212a-n generated by the context controller 204a contains data representing context information that is valid for a single point in time or a relatively short period of time overlapping with or near the time represented by the record's time field 212a, and so that the record's time field 212a may subsequently be used to identify the actual or approximate time(s) for which the information represented by the other fields 212b-i in the same record is valid.

Any references below to the "current sample period" in connection with the set of sensor outputs 208a-j therefore refers to a point in time or period of time defined by reference to the time represented by time sensor output 208a, such as the exact point in time represented by time sensor output 208a or a time period beginning with or otherwise including the point in time represented by time sensor output 208a. Similarly, any use of the terms "current" or "currently" below should be understood to refer to a time or time period defined by reference to the time represented by the time sensor output 208a. For example, in the context of a particular set of sensor outputs 208a-j within the current sample period, "the current user" should be understood to refer to the user represented by output 208b of user sensor 206b at or around the time represented by time sensor output 208a.

Sensor 206b is a user sensor, which receives user sensor input 214b and generates, based on input 214b, output 208b representing a user, such as a current user of one of the devices 124a-c or the system 100 as a whole. The sensor 206b may, for example, obtain input 214b representing user login credentials (e.g., username and/or password) or biometric information, and provide user output 208b uniquely identifying the user specified by the input to the sensor 206b. The user output 208b is not limited to output representing the identity of the user, but more generally may represent any data relating to the user.

Sensor 206c is a device sensor, which receives device input 214c and generates, based on input 214c, output 208c representing a device, such as one of the devices 124a-c of the system 100. The device output 208c during a particular sample period may, for example, represent a device currently used by the user represented by the output 208b of user identification sensor 206b during the sample period. The device sensor 206c may, for example, obtain input 214c representing a device serial number or other unique identifier of the device, and provide device output 208c uniquely identifying the device. The device output 208c is not limited to output representing the identity of the device, but more generally may represent any data relating to the device, such as data representing any aspect of the device's current configuration, such as audio volume, screen brightness, and whether any particular input or output components of the device currently are enabled or disabled.

Sensor 206d is an application sensor, which receives application input 214d and generates, based on input 214d, output 208d representing the state of one or more software applications (which includes any kind of software, such as operating systems, application programs, and web-based applications). For example, the application sensor output 208d during a particular sample period may, for example, represent the state of one or more software applications executing on a device. The application output 208d during a particular sample period may, for example, represent the state of one or more software applications executing on the device represented by the output 208c of device sensor 206c, or the state of one or more software applications being executed by or on behalf of the user represented by the output 208b of the user sensor 206b, during the same sample period. The application sensor output 208d may, for example, indicate which applications currently are executing, which application(s) is/are in the foreground, which application has the input focus, which application(s) currently is/are providing user output, and which application(s) currently is/are receiving user input. The application sensor 206d may obtain input 214d from any source, such as an operating system of the device represented by device sensor output 208c, or from applications by using application program interface (API) calls to such applications.

Sensor 206e is a message sensor, which receives message input 214e and, based on input 214e, generates output 208e representing information relating to one or more messages. Output 208e may, for example, represent a communication mode of the message (e.g., whether the message is an email message, a text message, or a live voice call), data from the message (such as the body of an email message, audio from a voice call, or text transcribed from a voice message), metadata of the message (such as a message header or metatag), the composition state of the message (e.g., whether the message currently is being composed or has already been composed), the manifestation state of the message (e.g., whether the message currently is being manifested), the transmission state of the message (e.g., whether the message currently is queued for transmission, attempted to be transmitted, or being transmitted), and the transmission direction of the message (e.g., whether the message currently is being sent or received by the user, device, or application represented by output 208b, 208c, or 208d, respectively). The message sensor 206e may obtain input 214e from any source, such as an operating system of the device represented by device sensor output 208c or by using application program interface (API) calls to individual applications.

Sensor 206f is a location sensor, which receives location input 214f and, based on input 214f, generates output 208f representing information relating to a current location of either or both of the user represented by user output 208b and the device represented by device output 208c. The location sensor 206f may obtain input 214f from any source, such as a Global Positioning System (GPS) device, a radio frequency identification (RFID) tag, or manual user input. The location sensor output 208f may represent the current location in any of a variety of forms, such as a latitude-longitude combination, or by one or more labels representing one or more categories of location (e.g., work, home, theater, restaurant). The location sensor 206f may, alternatively or additionally, obtain input 214f relating to and provide output 208f representing the proximity of the user and/or device to another user and/or device. Proximity data may, for example, be received directly from another device using infrared (IR) signals, or by comparing locations of user or devices to each other. Proximity output 208f may represent, for example, any one or more of the following: the degree of proximity (e.g., distance) to another device, the identity of the proximate device, and whether the device represented by device output 208c is proximate to another device of interest.

Sensor 206g is a velocity sensor, which generates output 208g representing information relating to a current velocity of either or both of the user represented by user output 208b and the device represented by device output 208c. The velocity sensor 207g may obtain data from any source, such as any of the sources from which the location sensor 206f may obtain data. The velocity sensor 206g may, alternatively or additionally, obtain data relating to and provide output 208g representing the current acceleration of the current user and/or the current device.

Sensor 206h is an activity sensor, which receives activity input 206h and, based on input 206h, generates output 208h representing information relating to a current activity in which the current user and/or the current device is engaged. Examples of activities are writing a message, reading a message, writing a document, reading a document, engaging in a voice call, listening to a voice message, and providing input of any kind to the current device. The activity sensor 206h may obtain input 214h from any source, such as from any user input device (e.g., keyboard, mouse, touchpad, touchscreen, or microphone) or by making API calls to software such as operating systems, application programs, and device drivers.

Sensor 206i is a calendar sensor, which receives calendar input 214i and, based on input 214i, generates output 208i representing information relating to data stored in a calendar of the current user and/or a calendar of the current device. Calendar output 208*i* may represent, for example, the presence or absence of an appointment at or near the current time, and any information relating to any appointment at or near the current time, such as the appointment's start time, end time, duration, location, priority (e.g., high or low), category, and attendee list. The calendar sensor 206*i* may obtain calendar input 214*i* from any source, such as a calendar application external to the system 200 (e.g., Microsoft Outlook, Apple iCal, Google calendar) or a calendar internal to the system 200. Calendar input 214*i* may, therefore, represent calendar appointments created in response to manual user input.

Because information about calendar appointments in the future (e.g., outside of the current sample period) may be useful, the calendar sensor 206*i* is not limited to generating output 208*i* representing calendar appointments within the current sample period. Rather, for example, the calendar sensor 206*i* may receive input 214*i* and generate output 208*i* representing any number of calendar appointments at any time in the past or future, such as calendar appointments occurring during the current calendar hour, day, week, or month; calendar appointments overlapping with a period including the current sample period and extending for some amount of time into the future (e.g., one minute, ten minutes, 30 minutes, one hour, or four hours); or the next appointment on the calendar (i.e., the first appointment to appear on the calendar after the current sample period, but not including any appointment that overlaps with the current sample period).

Sensor 206*j* is a user input sensor, which receives user input 214*j* and, based on input 214*j*, generates output 208*j* representing input provided by a user, such as the current user, or any of the users 122*a-b* of the system. User input sensor 206*j* may obtain data directly or indirectly from any user input device (e.g., keyboard, mouse, touchpad, touchscreen, or microphone) in response to the user providing input to such a device.

The particular context sensors 206*a-j* shown in FIG. 2 are merely examples and not limitations of the present invention. Embodiments of the present invention may use fewer than all of the context sensors 206*a-j*, sensors other than the sensors 206*a-j* shown in FIG. 2, or any combination thereof.

Figure 3A:
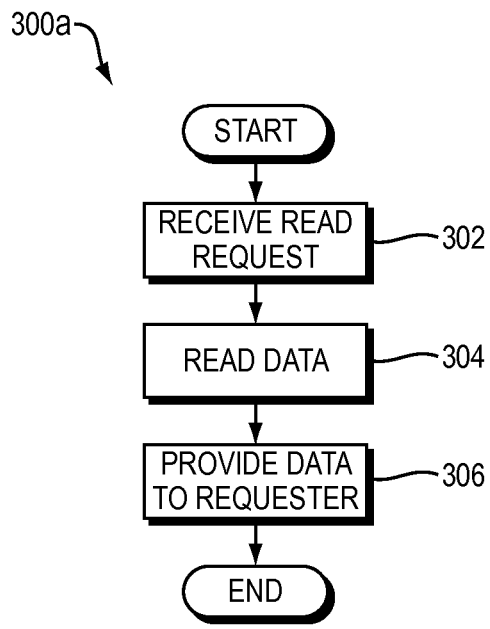
FIG. 3A is a flowchart of a method performed by the system of FIG. 1F according to one embodiment of the present invention.

In general, any of the profiles 110, 112*a-b*, and 114*a-c* of the system 100 of FIG. 1 may be controlled by a corresponding profile controller. For example, referring to the system of FIG. 1F and the method 300*a* of FIG. 3A, a profile controller 140 may receive a request 142 from a requester 144 to read data from a profile 146 controlled by the profile controller 140 (operation 302), in response to which the profile controller 140 may read the requested data 148 from the corresponding profile 146 (operation 304) and provide the requested data 148 (or output based on the requested data) to the requester 144 (operation 306). The request 142 may, for example, be a request to read all of the data in the profile 146 or a request to read a specified portion of the profile 146, such as the values of one or more specified parameters in the profile 146.

Figure 1F:
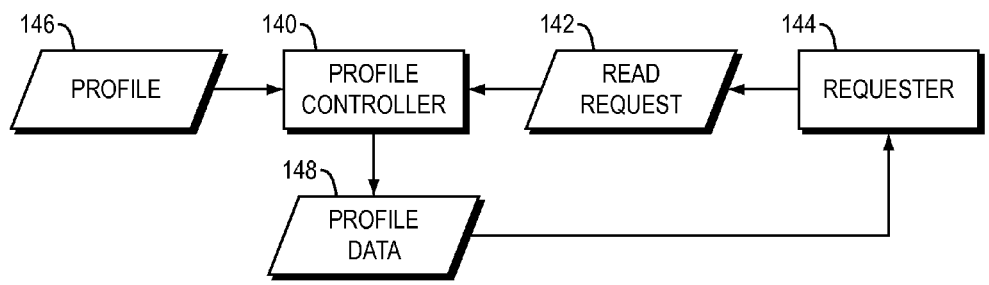
FIGS. 1F-1G are diagrams illustrating the operation of a profile controller according to one embodiment of the present invention.
Figure 1G:
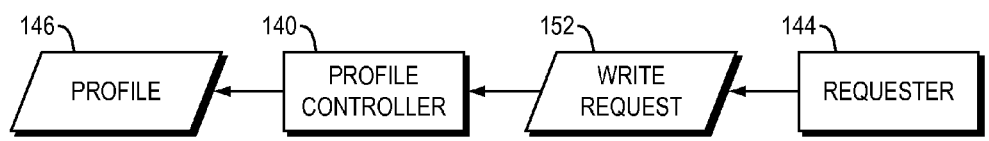
Figure 3B:
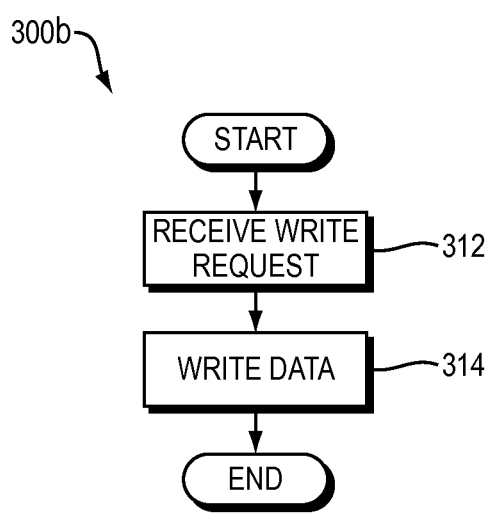
FIG. 3B is a flowchart of a method performed by the system of FIG. 1G according to one embodiment of the present invention.

Similarly, referring to the system of FIG. 1G and the method 300*b* of FIG. 3B, the profile controller 140 may receive a request 152 from the requester to write data specified by the request 152 to the corresponding profile 146 (operation 312), in response to which the profile controller 140 may write the requested data to the corresponding profile 146 (operation 314), thereby modifying the profile 146 as requested by the request 152. The request 152 may, for example, be a request to write data to the entire profile 146 or a request to write data to a specified portion of the profile 146, such as a request to write a specified value to a specified parameter of the profile 146.

In the case of FIGS. 1F and 1G, the requester may, for example, be a human user, a computer program, or a hardware component. Although only the generic profile controller 140 is shown in FIGS. 1F and 1G, it should be understood that controllers specific to the system profile 110, user profiles 112*a-b*, and device profiles 114*a-c* of FIG. 1A may be implemented in accordance with the techniques disclosed in connection with FIGS. 1F and 1G.

Modifying (e.g., writing a value to) a profile may cause changes to be made outside of the profile. For example, a device profile may include a parameter whose current value represents a current state of a feature of the device associated with the device profile. If the profile controller 140 changes the value of such a parameter, the profile controller 140 may also make a corresponding change to the state of the feature of the associated device, or cause such a change to be made. For example, a device profile associated with a telephone may include a "ring volume" parameter whose current value represents the current ring volume of the telephone. If the profile controller 140 changes the value of the "ring volume" parameter (such as by increasing the value to a higher value), the profile controller 140 may also make a corresponding change (e.g., increase) to the device's ring volume, or cause such a change to be made. For example, the device may include a mechanism that responds automatically to any change in the device's profile by making an appropriate corresponding change to a state of a feature of the device.

Figure 3C:
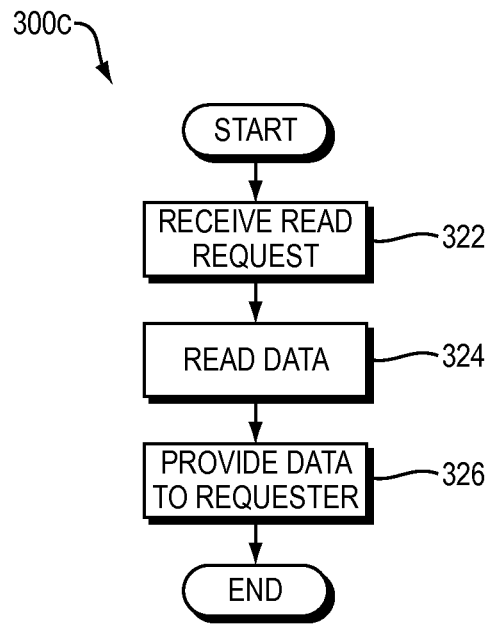
FIG. 3C is a flowchart of a method performed by the system of FIG. 1H according to one embodiment of the present invention.

In general, any of the logic modules 102*a-c* of the system 100 of FIG. 1 may be controlled by a corresponding logic module controller. For example, referring to the system of FIG. 1*h* and the method 300C of FIG. 3C, a logic module controller 160 may receive a request 162 from a requester 164 to read data from a logic module 166 controlled by the logic module controller 160 (operation 322), in response to which the logic module controller 160 may read the requested data 168 from the corresponding logic module 166 (operation 324) and provide the requested data 168 (or output based on the requested data) to the requester 164 (operation 336). The request 164 may, for example, be a request to read one or more of the condition specifiers in the logic module 166 and/or a request to read one or more of the action specifiers in the logic module 166. The output data 168, therefore, may represent one or more of the condition specifiers in the logic module 166 and/or a request to read one or more of the action specifiers in the logic module 166.

Figure 1H:
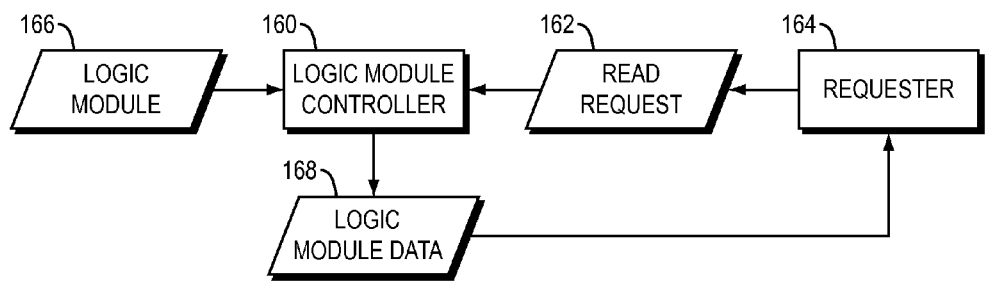
FIGS. 1H-1I are diagrams illustrating the operation of a logic module controller according to one embodiment of the present invention.
Figure 1I:
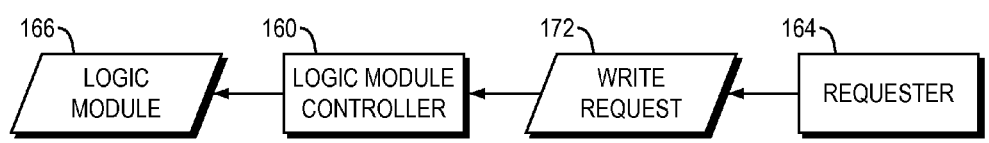
Figure 1J:
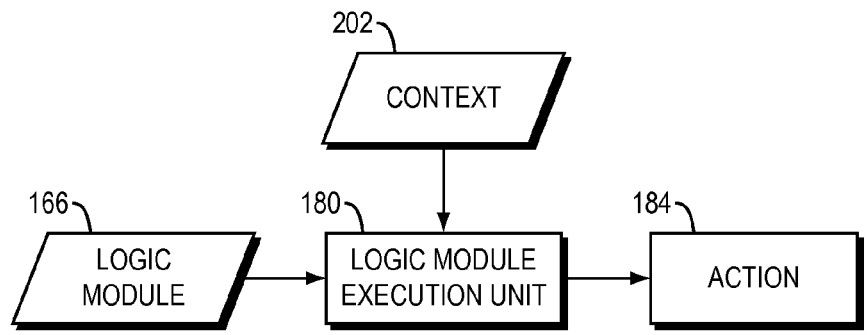
FIG. 1J is a diagram illustrating the operation of a logic module execution unit according to one embodiment of the present invention.
Figure 3D:
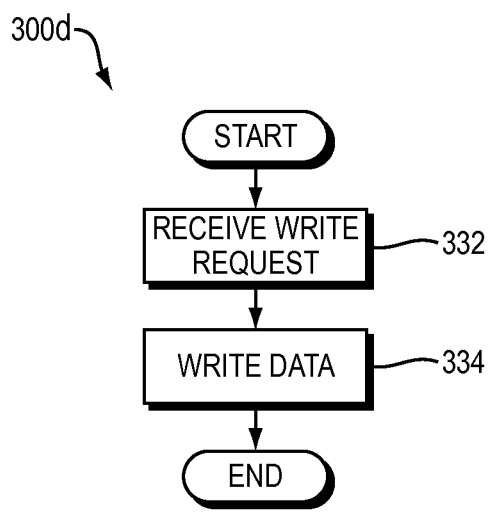
FIG. 3D is a flowchart of a method performed by the system of FIG. 1I according to one embodiment of the present invention.

Similarly, referring to the system of FIG. 1I and the method 300*d* of FIG. 3D, the logic module controller 160 may receive a request 172 from the requester 164 to write data specified by the request 172 to the corresponding logic module 166 (operation 332), in response to which the logic module controller 160 may write the requested data to the corresponding logic module 166 (operation 334), thereby modifying the logic module 166 as requested by the request 172. The request 172 may, for example, be a request to modify/delete/add a condition specifier and/or to modify/delete/add an action specifier in the logic module 166.

In the case of FIGS. 1H and 1I, the requester 164 may, for example, be a human user, a computer program, or a hardware component. For example, the read request 162 and/or write request 172 may be input generated in response to the manual action of a human user.

Logic modules 102*a-c* may be applied to the context data 202 to perform the actions 106*a-c* specified by the logic modules 102*a-c* if the context data 202 satisfies the conditions 104*a-c* specified by the logic modules 102*a-c*. For example, referring to the system of FIG. 1J and the method 300*e* of FIG. 3E, a logic module execution unit 180 may be associated with logic module 102*a*. Although not shown in FIG. 1J, similar logic module execution units may be associated with logic modules 102*b-c*.

Logic module execution unit 180 receives some or all of context data 202 as input (operation 352). Logic module execution unit 180 may, for example, receive: (1) only a single one of the records 210*a-n* within context data 202 as input, such as most recently-generated record, or the record whose time field 212*a* represents a time that is closest to the current real time; (2) only a subset of the records 210*a-n* associated with a particular one of the users 122*a-b*; or (3) only a subset of the records 210*a-n* associated with a particular one of the devices 124*a-c*.

Logic module execution unit 180 determines whether the received context data 202 satisfies the condition specified by condition specifier 104*a* of logic module 102*a* (operation 354). If the logic module execution unit 180 determines that the received context data 202 satisfies the condition, then, in response to the determination, the logic module execution unit 180 performs the action specified by action specifier 106*a* of logic module 102*a*, or causes the action to be performed (operation 356). As mentioned above, action specifier 106*a* may specify an action type or otherwise specify an action in generic terms, in which case operation 356 may include: (1) identifying (e.g., based on the received context data 202) one or more acts; and (2) performing the identified act(s) to implement the action specified by action specifier 106*a*. As a result, performing operation 356 multiple times for the same action specifier 106*a* may cause the logic module execution unit 180 to perform different acts each time, based on differences in the context data 202 received each time.

Figure 3E:
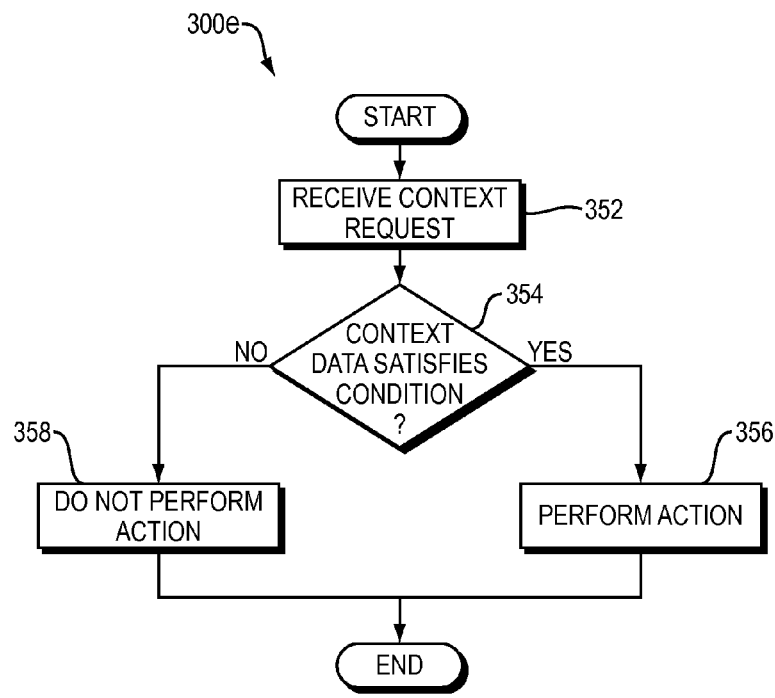
FIG. 3E is a flowchart of a method performed by the system of FIG. 1J according to one embodiment of the present invention.

If the logic module execution unit 180 does not determine that the received context data 202 satisfies the condition specified by condition specifier 104*a*, then the logic module execution unit 180 does not perform the action specified by action specifier 106*a* of logic module 102*a* (operation 358). The method 300*e* of FIG. 3E is an example of "applying" a logic module to context data, as the term "applying" is used herein.

The action 184 performed in response to the determination that the context 202 satisfies the condition specified by the logic module 102*a* may be an action that modifies a profile (e.g., a system profile, a user profile, or a device profile) or an action that modifies a logic module (e.g., a condition specifier or an action specifier of a logic module). For example, the logic module execution unit 180 may be the requester 144 in FIGS. 1F and 1G, and the action 184 may be the read request 142 (FIG. 1F) or the write request 152 (FIG. 1G). Similarly, the logic module execution unit 180 may be the requester 164 in FIGS. 1H and 1I, and the action 184 may be the read request 162 (FIG. 1H) or the write request 172 (FIG. 1I). As a result, changes in the context data 202 may automatically trigger changes in profiles and in logic modules.

Figure 3F:
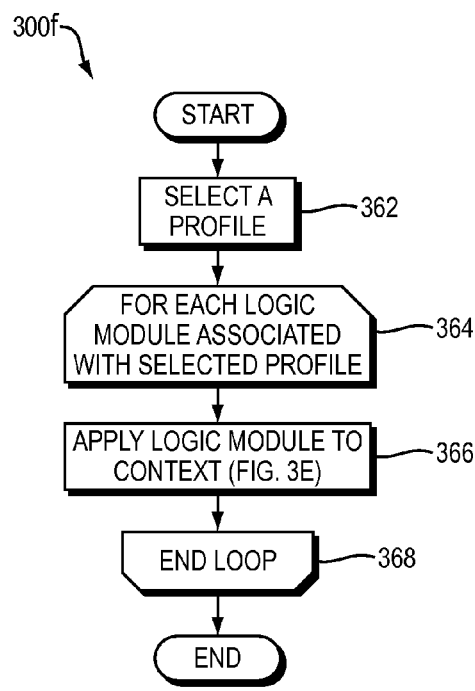
FIGS. 3F and 3G are flowcharts of methods performed by the system of FIG. 1K according to embodiments of the present invention.

As described above, a profile may be associated with one or more logic modules. A profile may be "applied" (executed) by applying (executing) some or all of the logic modules associated with the profile. For example, referring to FIG. 1K, a profile execution unit 190 is shown. The profile execution unit 190 may execute (apply) a profile 192 (which may, for example, be any of the profiles shown in FIG. 1) by performing the method 300*f* of FIG. 3F in response to receipt of a trigger input 196. The trigger input 196 may be any input, such as any of the sensor inputs 214*a-j*, any of the context data 202, or manual user input provided using any input device. For example, if the trigger input 196 is time sensor input 206*a*, time sensor output 208*b*, or time field 212*a*, the profile execution unit 190 may perform method 300*f* periodically or according to a schedule.

The method 300*f* identifies the profile 192 (operation 392) in any of a variety of ways. For example, if the system 100 includes only a single profile, then operation 362 may select the single profile. As another example, operation 362 may select a profile based on user input. As another example, the method 300*f* may loop over a plurality of profiles (e.g., all profiles in the system 100, all profiles associated with a user, or all profiles associated with a device), and select a particular one of such profiles in operation 362.

Figure 1K:
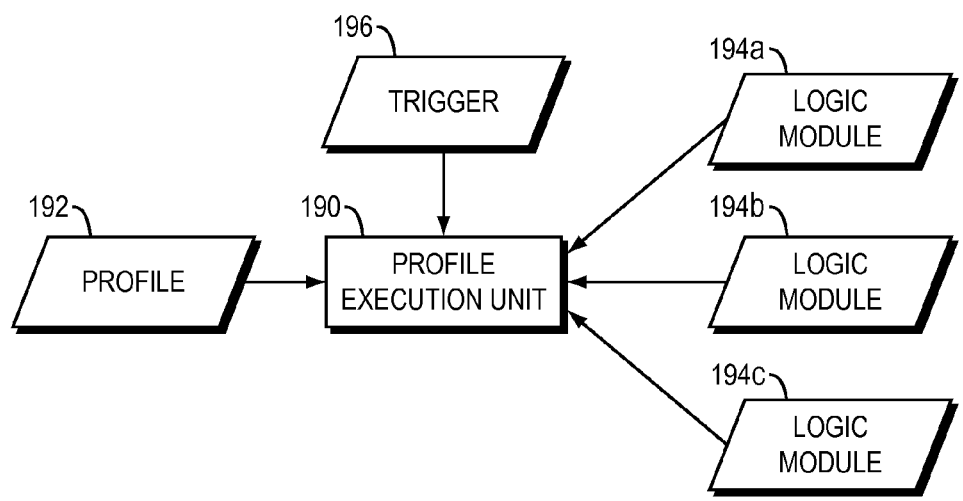
FIG. 1K is a diagram illustrating the operation of a profile execution unit according to one embodiment of the present invention.

The method 300*f* enters a loop over all logic modules 194*a-c* associated with profile 192 (operation 364). Such logic modules 194*a-c* may be identified, for example, using associations of the kind shown in FIG. 1E. For each such logic module (three of which are shown in FIG. 1K solely for purposes of example), the method 300*f* applies the logic module to the context data 202 in any of the manners disclosed above in connection with FIGS. 1J and 3E (operation 366). The method 300*f* repeats operation 366 for any remaining logic modules associated with the current profile (operation 368). The method 300*f* repeats operations 364-368 for any remaining profiles (operation 370).

Optionally, the system 100 may include two types of logic modules: action logic modules and trigger logic modules. An action logic module operates in the manner disclosed above, such as in connection with FIGS. 3E and 3F. A trigger logic module, like an action logic module, may specify a condition and an action, but additionally define a trigger. For example, referring again to FIG. 1A, logic modules 102*a-c* are shown with optional logic module types 108*a-c*, respectively. Logic module type 108*a* indicates whether logic module 102*a* is an action or trigger logic module; logic module type 108*b* indicates whether logic module 102*b* is an action or trigger logic module; and logic module type 108*c* indicates whether logic module 102*c* is an action or trigger logic module.

Figure 3G:
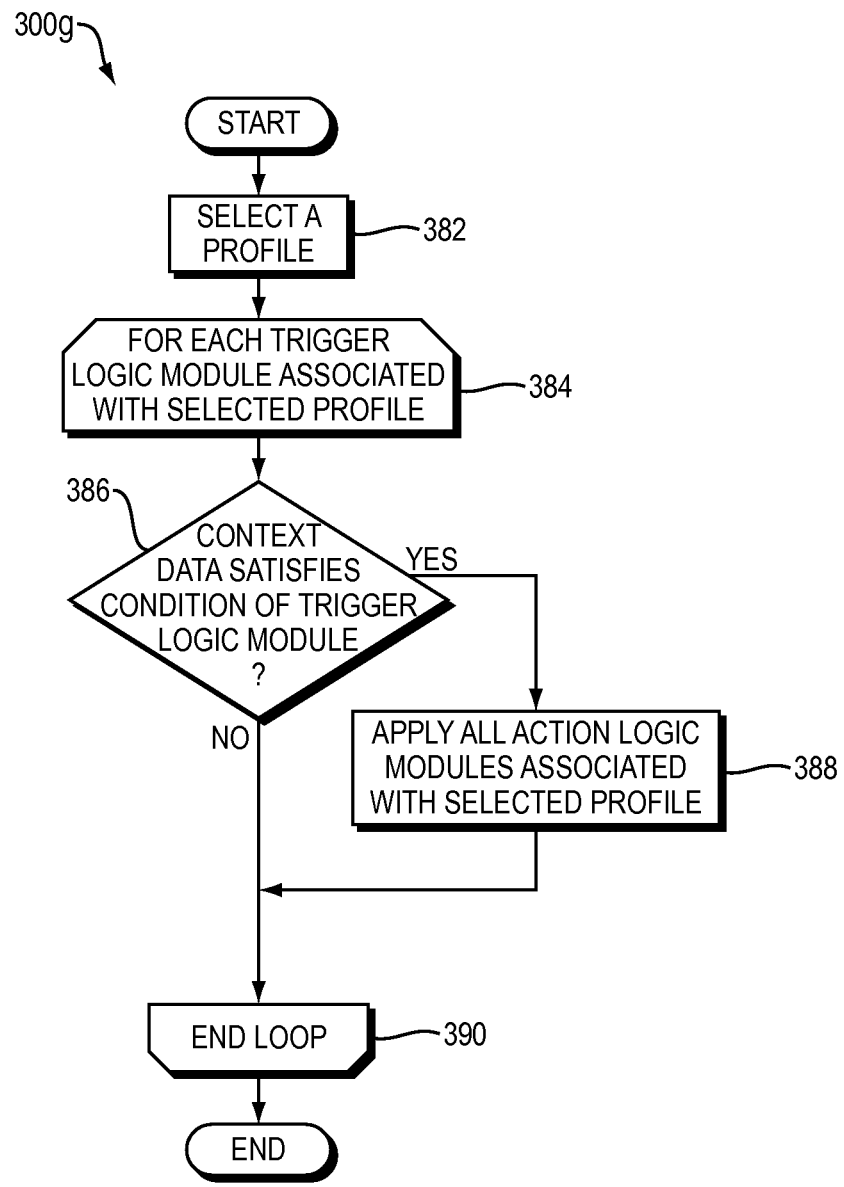

The purpose of these two logic module types may be understood by reference to their operation. Referring to FIG. 3G, a flowchart is shown of a method 300*g* for applying (executing) both types of profiles in the system 100. The method 300*g* selects a profile (operation 382) in any of the manners described above in connection with operation 362 of method 300*f* of FIG. 3F.

The method 300*g* enters a loop over any and all trigger logic modules associated with the current profile. Such logic modules may be identified, for example, using associations of the kind shown in FIG. 1E and by reference to the logic module type fields 108*a-c* of the logic modules 102*a-c*. In other words, the loop initiated at operation 384 is not a loop over all logic modules associated with the current profile, but only a loop over the trigger logic modules associated with the current profile. For each such trigger logic module, the method 300*g* determines whether the condition defined by the trigger logic module is satisfied by the context data 202, in any of the manners described above in connection with operation 354 of method 300*e* of FIG. 3E (operation 386). If the context data 202 satisfies the condition of the current trigger logic module, then the method 300*g* applies all action logic modules associated with the current profile, in any of the manners disclosed above in connection with FIGS. 1J and 3E (operation 388). Otherwise, the method 300*g* does not apply the action logic modules associated with the current profile to the context data 202. The method 300*g* repeats the operations described above for any remaining trigger logic modules associated with the current profile (operation 390).

As the description above makes clear, the use of trigger logic modules may eliminate the need to apply (execute) action logic modules that do not, or are not likely to, satisfy the context data 202. As a result, the use of trigger logic modules may enable embodiments of the present invention to be implemented more efficiently than embodiments which require that all logic modules associated with a profile be applied to the context data 202.

For example, as will be described in more detail below, a profile may be associated with a trigger logic module that defines a condition that is satisfied only when a message is detected, or only when a message transmissible via a particular communication mode is transmitted. The same profile may be associated with one or more action logic modules that define conditions that may be satisfied by particular features of messages transmissible via the particular communication mode. Use of a trigger logic module eliminates the need to apply the action logic modules in circumstances in which their conditions are not satisfied.

The various components shown in FIGS. 1A-1K and FIG. 2, and the various methods shown in FIGS. 3A-3G, may be implemented in various physical systems. For example, such components and methods may be integrated into a single device or distributed across multiple devices in any of a variety of ways. For example, FIG. 4A shows a system 400a in which various functions disclosed herein are implemented in a single device 402, such as a desktop computer, handheld computer, cell phone, or other computing device or communication device.

Figure 4A:
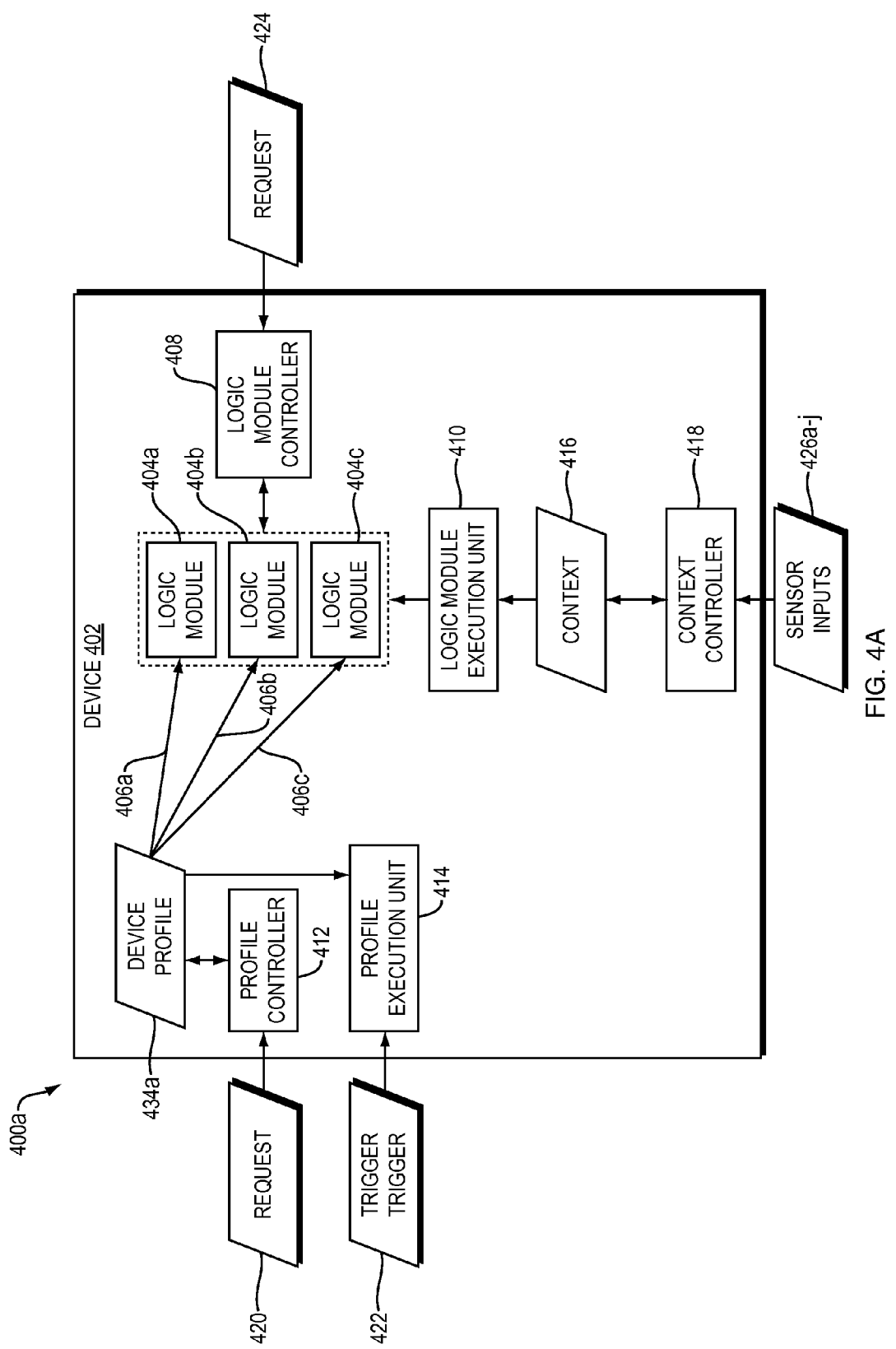
FIG. 4A is a diagram of a computer control system implemented on a single device according to one embodiment of the present invention.

For example, referring to FIG. 4A, a diagram is shown of one example of a system 400a that implements various features disclosed above. The system 400a includes a device 402, which includes a single device profile 404. The device 402 also includes three logic modules 404a-c which are associated 406a-c with device profile 404. The device 402 includes a single logic module controller 408 for controlling the logic modules 404a-c, and a single logic module execution unit 410 for executing all of the logic modules 404a-c. The device 402 includes a profile controller 412 for controlling the device profile 404, and a profile execution unit 414 for executing the device profile 404. The device 402 includes context data 416 and a context controller 418 for controlling the context data 416.

The elements of the device 402 may operate in the manner previously described. For example, profile controller 412 may read data from and write data to the device profile 404 in response to requests 420, the profile execution unit 414 may execute the device profile 404 in response to a trigger 422, logic module controller 408 may read data from and write data to logic modules 404a-c in response to requests 424, logic module execution unit 410 may execute the logic modules 404a-c based on the context data 416, and context controller 418 may read from and write to the context data 416 based on sensor inputs 426.

Although device 402 may receive inputs (e.g., request 420, trigger 422, request 424, and sensor inputs 426) from any source, one such source is a human user who provides one or more such inputs manually using any one or more input devices within and/or connected to the device 402. Any of such inputs may, for example, be generated in response to and based on one or more gestures by the human user, such as a single gesture (e.g., a single mouse click, a single keypress, a single touch, or a single spoken word). The same is true of any inputs disclosed herein in connection with any device.

Figure 4B:
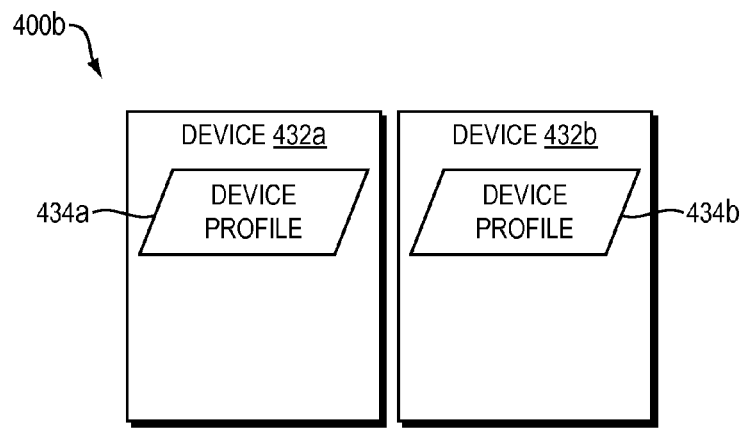
FIG. 4B is a diagram illustrating a physical implementation of device profiles according to one embodiment of the present invention.

As another example, referring to FIG. 4B, a diagram is shown of one example of another system 400b that implements various features disclosed above. The system 400a includes two devices 432a and 432b, each of which may contain the same or similar components as the device 402 of FIG. 4A. Therefore, for ease of illustration, various components from FIG. 4A are not shown within the devices 432a-b of FIG. 4B. Instead, FIG. 4B illustrates that device 432a includes a first device profile 434a and device 432b includes a second device profile 434b that differs from the first device profile 432a. The first device profile 434a may, for example, be associated with a first set of logic modules (not shown), while the second device profile 434b may, for example, be associated with a second set of logic modules (not shown) that differs from the first set of logic modules. As a result, even if the two devices 432a-b are provided with the same context data 416 as input, the two devices 432a-b may take different actions in response to such context data 416 due to differences in their device profiles 434a-b. Alternatively, for example, the devices 432a-b may contain identical device profiles, or no device profiles, but contain user profiles that differ from each other, thereby causing the devices 432a-b to take different actions in response to the same context data 416.

Figure 4C:
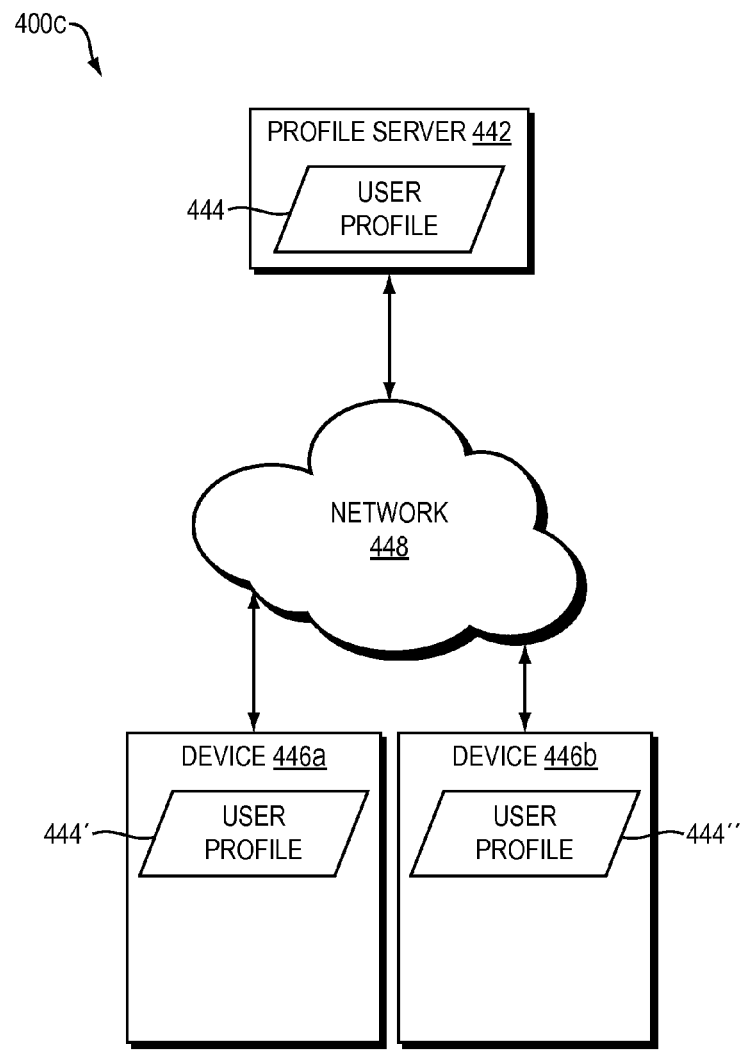
FIG. 4C is a diagram illustrating a physical implementation of user profiles according to one embodiment of the present invention.

As another example, referring to FIG. 4C, a diagram is shown of one example of a system 400c that implements various features disclosed above. The system 400c includes a profile server 442, which may be any kind of computing device, and which includes a user profile 444 associated with a human user (not shown). The system 400c also includes devices 446a and 446b, each of which may contain the same or similar components as the device 402 of FIG. 4A. Device 446a includes user profile 444', which is identical in content to user profile 444 on the server 442. Similarly, device 446b includes user profile 444", which is identical in content to user profile 444 on server 442. If a modification is made to the user profile 444 at the server 442, the server 444 may, in response, automatically transmit signals over a network 448 (such as the Internet) to both device 446a and device 446b sufficient to cause the modification to be reflected in user profiles 444' and 444". Similarly, if a modification is made to the user profile 444' at the device 446a, the device 446a may, in response, automatically transmit signals over network 448 to server sufficient to cause the modification to be reflected in user profile 444; in response to which the server 442 may automatically transmit signals over network 448 to device 446b sufficient to cause the modification to be reflected in user profile 444". The system 400c may take similar action in response to a modification made to user profile 444".

Similar techniques may be applied to system profiles and device profiles that are replicated across multiple devices. Similar techniques may also be applied to profiles of any kind that are distributed across multiple devices, i.e., in which a first portion of one profile is stored on and applied by a first device and in which a second portion of the same profile is stored on and applied by a second device.

As these examples illustrate, a "device" profile may, but need not, be stored on the device associated with the profile. For example, the device profile associated with a device may be stored solely on a server, which contains a device profile controller that controls the device profile and uses the output of the device profile to control the device accordingly. As another example, the server may contain the device profile, while the device may contain the device profile controller, which may access the device profile remotely at the server.

Various execution modules, such as the profile controller 412, profile execution unit 414, context controller 418, logic module controller 408, and logic module execution unit 410, may also be replicated across multiple devices (including, e.g., clients and/or servers) and/or distributed across multiple devices. In particular, any particular execution module may execute on one device but process data located on another device. For example, in the system 400c of FIG. 4C, the profile server 442 may contain a user profile controller (not shown) that controls both the user profile 444 and the user profiles 444' and 444", in which case the devices 446a and 446b may not include user profile controllers. Similarly, any particular execution module may execute on one device and provide output to another device.

One or more of the associations disclosed herein, such as the associations 136a-g shown in FIG. 1E, may be implemented in records tangibly stored on one or more non-transitory computer-readable media. For example, in FIG. 4A, associations 406a-c between device profile 404 and logic modules 404a-c may be stored on one or more computer-readable media within the device 402. Associations may be replicated and/or distributed across devices. Associations between two components may be implemented by storing one element within the other. For example, an association between a logic module and a profile may be implemented by storing the logic module (or a copy thereof) within the profile.

Any profile or logic module may have an activation state. An activation state has is a parameter that has two permissible value: active and inactive. For ease of explanation, an activation state whose value is active is referred to herein as an active activation state, while an activation state who value is inactive is referred to herein as an inactive activation state. Similarly, a component (profile or logic module) whose activation state is active is referred to herein as an active component, while a component whose activation state is inactive is referred to herein as an inactive component. If a component is active, then the component's controller applies (executes) the component in any of the ways disclosed herein. If a component is inactive, then the component's controller may either not apply (execute) the component, or may apply the component but not generate any output from the component. For example, if a logic module is inactive, then the logic module's controller may either not execute the logic module even if the context data satisfies the logic module's condition, or the logic module's controller may execute the logic module but not perform the action specified by the logic module even if the context data satisfies the logic module's condition.

An activation state may, for example, be implemented as a special kind of logic module condition that takes precedence over any other conditions specified by the logic module. In other words, the logic module's execution unit may, as part of determining whether the context data satisfies the logic module's conditions, treat the logic module's activation state as if it were part of the context data and determine whether the logic module's activation state is active before determining whether any of the logic module's other conditions (if any) are satisfied by the context data. As a result, if the logic module's activation state is inactive, the logic module's execution unit will not attempt to determine whether any of the logic module's other conditions are satisfied by the context data, even if one or more other conditions are satisfied by the context data.

The values of the activation states of distinct components may differ from each other. As with any other data disclosed herein, the activation state of a component may be tangibly stored in a non-transitory computer-readable medium, whether within the component itself or elsewhere. A component's controller may be used to read the value of a component's activation state and to write a value to (e.g., modify the value of) the component's activation state in any of the ways disclosed herein. For example, a component's controller may change a component's activation state from active to inactive or from inactive to active in response to manual user input, such as manual user input specifying the desired activation state value, or manual user input indicating that the activation state value should be toggled.

If multiple profiles are associated with a system, device, or user, any one or more of such profiles may be active simultaneously. It may be useful, however, for only one profile associated with a system, device, or user to be active at any particular time. In such a case, the profile that is active is referred to herein as "the active profile" or "the current profile" in connection with the system, device, or user. Embodiments of the present invention may enforce such a scheme by determining that a particular profile associated with a system, device, or user has become active and, in response to the determination, deactivating all of the other profiles associated with the system, device, or user. As described below, a profile associated with a system, device, or user may become the active profile in response to any of a variety of inputs, such as manual user input selecting the profile as the active profile.

Certain embodiments of the present invention may be used in connection with the transmission of messages. For example, the conditions specified by logic modules may be satisfied by the detection of messages, by particular message content, or by the identities of message senders and/or recipients. As another example, the actions specified by logic modules may be actions performed on messages, such as blocking, allowing, forwarding, or deferring messages.

For example, FIG. 5A shows an embodiment of a system 500a which may include any of the elements disclosed above (e.g., in FIGS. 1A-1K and FIG. 2), but which only shows elements of interest for ease of illustration. The system 500a includes a first logic module 502a and a second logic module 502b. The first logic module 502a includes one or more condition specifiers 504a and an action specifier 510a. More specifically, the first logic module 502a includes a first communication mode condition specifier 506a that specifies a condition that is satisfied by messages transmissible via a first communication mode, and the second logic module 502b includes a second communication mode condition specifier 506b that specifies a condition that is satisfied by messages transmissible via a second communication mode that differs from the first communication mode.

The first logic module 504a may, but need not, include one or more additional condition specifiers 508a that may specify any of the conditions disclosed herein. Similarly, the second logic module 504b may, but need not, include one or more additional condition specifiers 508b that may specify any of the conditions disclosed herein. Although either or both of the additional conditions 508a-b in FIG. 5A may include an activation state, FIG. 5B explicitly shows an example of a system 500b in which logic modules 502a-b contain activation states 512a-b.

The system 500a may, but need not, also include any number of additional similar logic modules, such as a third logic module 502c that includes one or more condition specifiers 504c and a third action specifier 510c. The third condition specifiers 504c may include a third communication mode condition specifier 506c that specifies a condition that is satisfied by messages transmissible via a third communication mode that differs from both the first communication mode and the second communication mode. The third logic module 504c may, but need not, include one or more additional condition specifiers 508c that may specify any of the conditions disclosed herein (including an activation state, such as the activation state 512c shown in FIG. 5C).

Each of the first, second, and third action specifiers 510a-c may specify any action. The action specified by the first action specifier 510b may differ from the action specified by the second action specifier 510b and from the action specified by the third action specifier 510c. For example, no two of the actions specified by action specifiers 510a-c may be the same as each other.

Figure 5C:
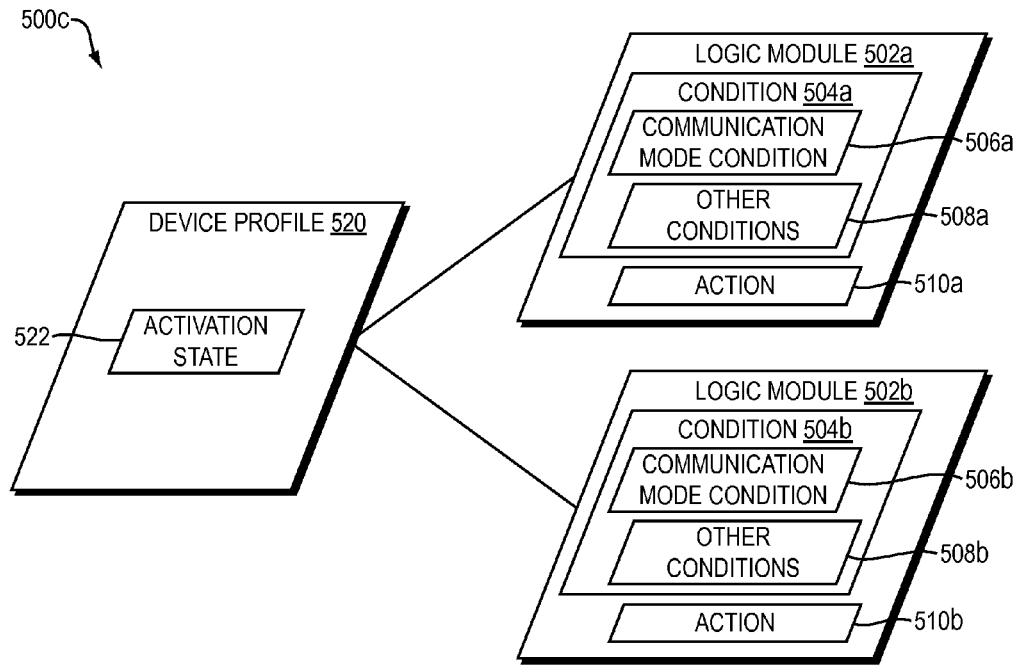

FIG. 5C shows an example of a system 500c in which a device profile 520 associated with logic modules 502a-c includes an activation state 522, but in which the logic modules 502a-c do not include activation states. As a result, when the device profile 520 is active, applying the device profile 520 necessarily includes applying the logic modules 502a-c; when the device profile 520 is inactive, applying the device profile 520 does not include applying the logic modules 502a-c.

Figure 5D:
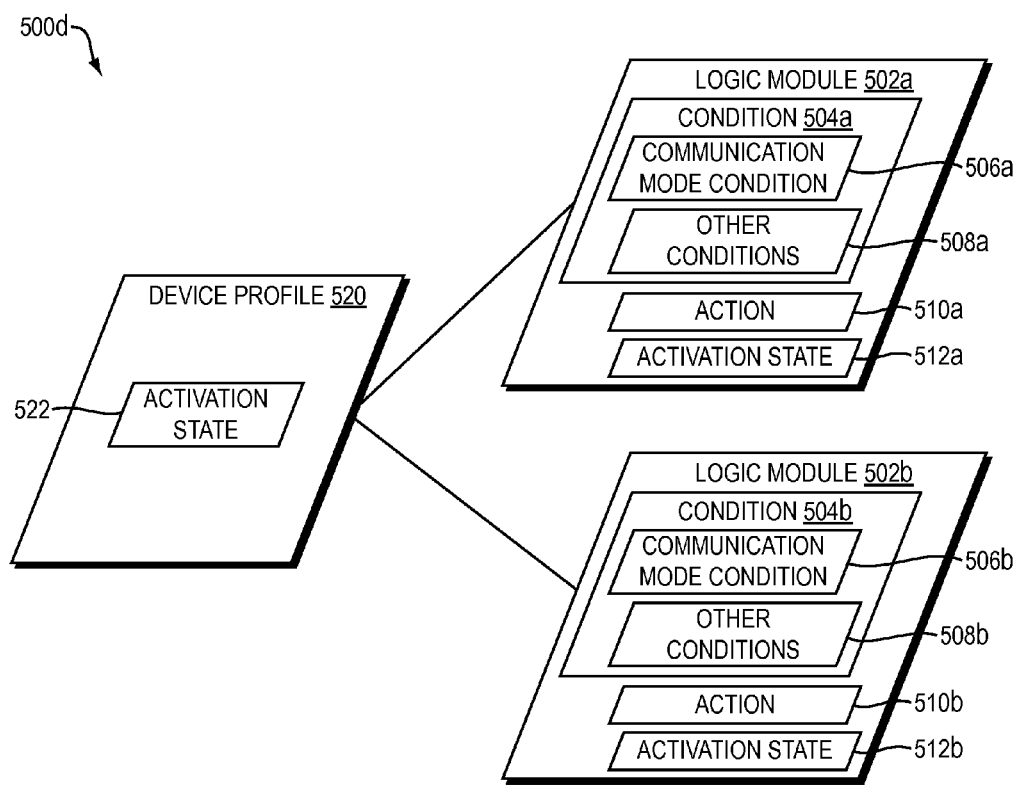

FIG. 5D shows an example of a system 500d in which a device profile 520 associated with logic modules 502a-c includes an activation state 522 (as in FIG. 5C), and in which the logic modules 502a-c include activation states 512a-c (as in FIG. 5B). As a result, when the device profile 520 is active, applying the device profile 520 includes applying only the active logic module(s) (if any) among logic modules 502a-c; when the device profile 520 is inactive, applying the device profile 520 does not include applying any of the logic modules 502a-c, even active logic modules. In other words, in the embodiment of FIG. 5D, the activation state 522 of device profile 520 overrides the activation states 512a-c of logic modules 502a-c.

Communications modes and examples thereof will be described in more detail below. Examples, however, of first and second communication modes, or of first, second, and third communication modes that may be specified by the communication mode condition specifiers disclosed above in connection with FIG. 5A are: (1) email and voice calls; (2) email and text messages; (3) voice calls and text messages; and (4) email, text messages, and voice calls.

The system 500a of FIG. 5A may, for example, be used to enable control of messages transmissible via multiple distinct communication modes. For example, as shown in FIGS. 5C and 5D, device profile 520 may be associated with two or more of the logic modules 502a-c. The techniques disclosed herein may then be used to apply the associated logic modules to messages transmissible via the device associated with the device profile, and thereby to control messages transmissible via multiple communication modes in accordance with the logic modules associated with the device profile. The same techniques may be applied if a system profile or a user profile, rather than a device profile, is associated with two or more of the logic modules 502a-c.

Figure 6A:
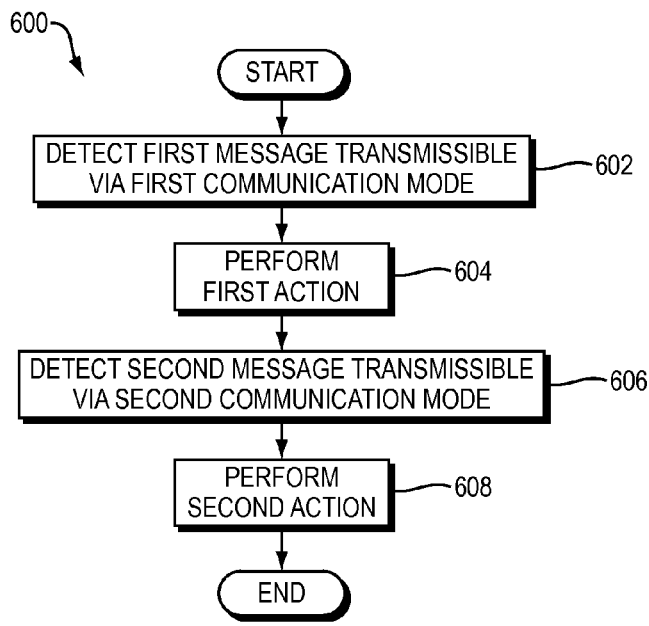
FIGS. 6A-6D are flowcharts of methods performed to execute profiles and logic modules according to embodiments of the present invention.

For example, FIG. 6A shows a flowchart of a method 600 that may be performed by the system 500a of FIG. 5A. The system 500a may detect a first message transmissible via the first communication mode (operation 602), in response to which the system 500a may perform the first action (operation 604). The system 500a may, for example, receive the first message, determine whether the first message is transmissible via the first communication mode, and perform operation 604 only if the first message is determined to be transmissible via the first communication mode. The system 500a may detect a second message transmissible via the second communication mode (operation 606), in response to which the system 500b may perform the second action (operation 608).

Figure 6B:
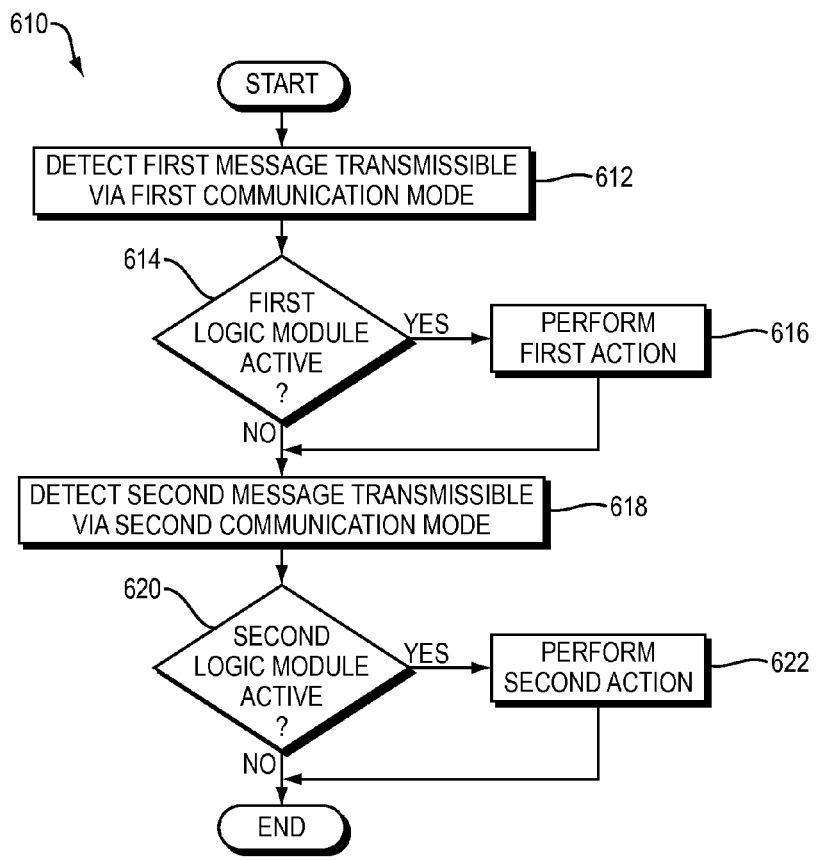

FIG. 6B shows a flowchart of a method 610 that may be performed by the system 500b of FIG. 5B. In the case of FIG. 5B, the system 500b may detect a first message transmissible via the first communication mode (operation 612). The system 500b may determine whether the first logic module 502a is active (operation 614). If the first logic module 502a is active, the system 500b may (in response to the determination) perform the first action (operation 616); otherwise, the system 500b may not perform the first action, even if the first message satisfies all of the conditions 504a of the first logic module 502a. The system 500b may detect a second message transmissible via the second communication mode (operation 618). The system 500b may determine whether the second logic module 502b is active (operation 620). If the second logic module 502b is active, the system 500b may (in response to the determination) perform the second action (operation 622); otherwise, the system 500b may not perform the second action, even if the second message satisfies all of the conditions 504b of the second logic module 502a.

Figure 6C:
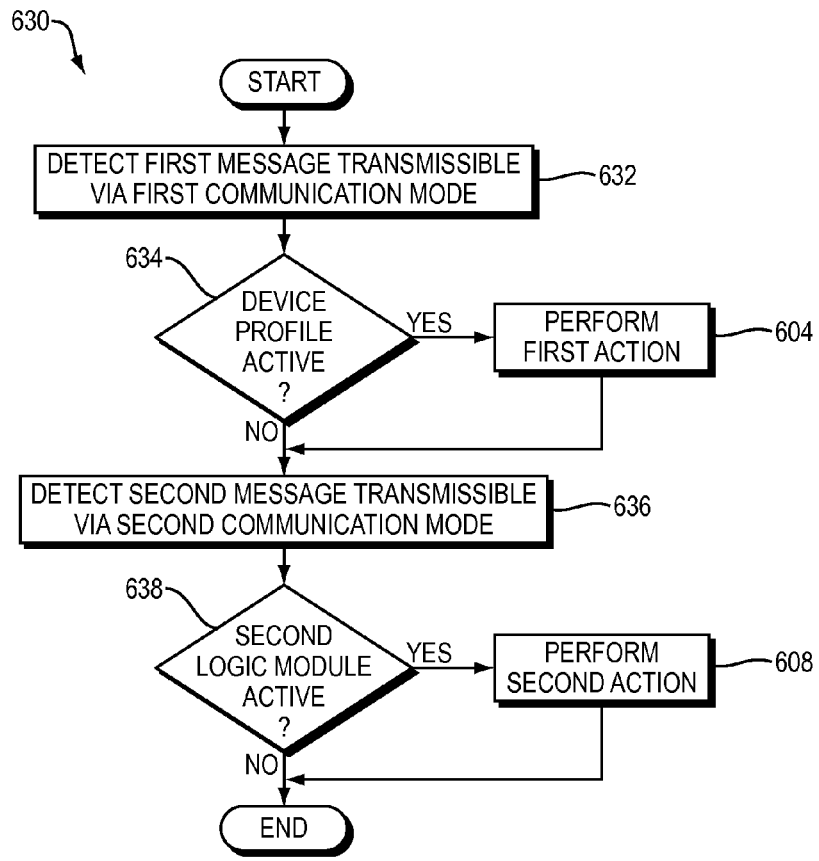

FIG. 6C shows a flowchart of a method 630 that may be performed by the system 500c of FIG. 5C. The system 500c may detect a first message transmissible via the first communication mode (operation 632). The system 500b may determine whether the device profile 520 is active (operation 634). If the device profile 520 is active, the system 500c may (in response to the determination) perform operation 604 as described above; otherwise, the system 500c may not perform operation 604, even if the first message satisfies all of the conditions 504a of the first logic module 502a. The system 500c may detect a second message transmissible via the second communication mode (operation 636). The system 500c may determine whether the device profile 520 is active (operation 638). If the device profile 520 is active, the system 500c may (in response to the determination) perform operation 608 as described above; otherwise, the system 500c may not perform operation 608, even if the second message satisfies all of the conditions 504b of the second logic module 502a.

The method 630 of FIG. 6C need not make multiple determinations whether the device profile 520 is active (e.g., operations 634 and 638). Instead, for example, operations 634 and 638 may be removed from method 630 and replaced with a single operation that is the same as operation 634 or 638, but which is performed before operation 632, so that operations 602-608 are not performed if the device profile 520 is determined to be inactive, even if the system 500c receives a message transmissible via the first communication mode or a message transmissible via the second communication mode. Similar techniques may be applied to any system disclosed herein, to any kind of profile, and to logic modules having activation states.

As yet another example, if device profile 520 is inactive, then the system 500c may not make any determination whether the device profile 520 is active while the device profile 520 is inactive, even if the system 500c receives a message transmissible via the first communication mode or a message transmissible via the second communication mode. An inactive device profile, in other words, may effectively be disabled so that the system 500c does not apply the device profile (e.g., determine whether the device profile's conditions are satisfied) while the device profile is inactive. Similar techniques may be applied to any system disclosed herein, to any kind of profile, and to logic modules having activation states.

Figure 6D:
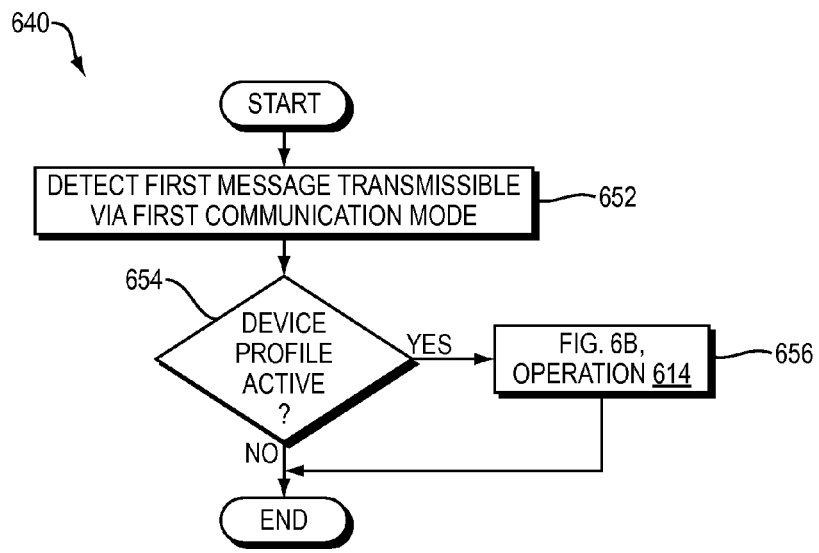

FIG. 6D shows a flowchart of a method 650 that may be performed by the system 500d of FIG. 5D. The system 500d may detect a first message transmissible via the first communication mode (operation 652). The system 500d may determine whether the device profile 520 is active (operation 654). If the device profile 520 is active, the system 500d proceed to operation 614 of FIG. 6B and perform the remainder of the method 610 of FIG. 6B (operation 656). Otherwise, the system 500d may not perform operation 656 and may not otherwise apply the device profile 520.

Changing activation states in the systems 500b-d of FIGS. 5B-5D may cause the systems 500b-d to change their handling of messages and other context. For example, consider the system 500c of FIG. 5C. If the device profile 520 is active at a first time, then the system 500c may, in response to receiving messages of the first and second communication modes, perform operations 602-604 and 606-608, as described above in connection with FIG. 6C. Then, if the activation state 522 of the device profile 520 is changed to inactive and the system 500c receives messages of the first and second communication modes, the system 500c may not perform operations 602-604 or 606-608, as described above in connection with FIG. 6C. The activation state 522 of the device profile 520 may, as described above, be changed in response to user input. As a result, a user may control whether the device profile 520 is active at any particular time and thereby control the manner in which the system 500c processes detected messages of various communication modes.

Condition specifiers, such as condition specifiers 508a-c in FIG. 5, may, for example, specify conditions that are satisfied by context data indicating that:
- the current time is: a particular time of day, within a particular time period (e.g., 9:00 AM-5:00 PM) on any day, within a particular time period that satisfies an additional condition (e.g., 9:00 AM-5:00 PM on a weekday), within a particular day of the week, a particular day of any month (e.g., $1^{st}$ or $15^{th}$), on a holiday, within a user-specified time period (e.g., a birthday or anniversary), or within a time period delimited by a timer initiated at a previous time and having either a specified duration or a specified end time;
- the current user: is a particular user (e.g., having a particular real name, user name, or other unique identifier contained within a list or satisfying other conditions), has particular privileges or access rights, or has provided credentials satisfying predetermined criteria;
- the current device: is a particular device (e.g., having a particular serial number or unique identifier), is owned by or otherwise associated with a particular user or class of user, has or lacks particular communication capabilities (e.g., the ability to transmit messages via a particular communication mode), has or lacks hands-free capability (e.g., voice control), has or lacks a particular kind of output device (e.g., a touch screen or a text-to-speech reader), or has or lacks a particular kind of input device (e.g., a microphone or touchscreen);
- any application executing on the current device or associated with the current user: is receiving input from a user (e.g., keyboard input or voice input), is providing output of any kind to a user, is providing message-related output to a user (e.g., manifesting a message or a notification of a message), is manifesting visual output, is manifesting auditory output, is transmitting a message, or includes means for transmitting messages (e.g., messages transmissible via one or more predetermined communication modes);
- a message: is being composed by the current user; is being manifested to the current user; is being transmitted to or from the current user or any device associated with the current user; contains data (e.g., a body) satisfying predetermined criteria; contains meta-data (e.g., subject, headers) satisfying predetermined criteria; has a sender or recipient satisfying predetermined criteria; has a priority satisfying predetermined criteria; or has a time (e.g., time sent or time received) satisfying predetermined criteria;
- a current or scheduled location of a device: is a particular location, is within a particular geographic area, is a particular category of location (e.g., home, work, classroom, restaurant, lecture hall, theater, vehicle, hospital), is an exterior location, is an interior location;
- a first device is in proximity to (e.g., within no more than some predetermined maximum distance of) a second device, such as any other device, or another device associated with a user satisfying predetermined criteria (such as a user who is a friend, family member, colleague, or within the same online social network as the user associated with the first device);
- a device is moving at a speed that is greater than or less than a predetermined maximum or minimum speed, respectively;
- a device's acceleration is greater than or less than a predetermined maximum or minimum speed, respectively;
- a current activity of a user: is a communicative activity (e.g., composing, sending, receiving, viewing, or reading a message), is a particular category of activity (e.g., home, work, leisure, study), includes providing any input to a device, or includes providing input to a device using a particular kind of input device (e.g., microphone, keyboard, or touchscreen);
- a calendar indicates that: the current time is within an appointment on the calendar, an appointment on the calendar is scheduled to begin no more than some predetermined amount of time later than the current time (e.g., 1 minute, 5 minutes, 30 minutes, 1 hour, 4 hours, or 1 day), an appointment on the calendar was scheduled to begin no more than some predetermined amount of time earlier than the current time (e.g., 1 minute, 5 minutes, 30 minutes, 1 hour, 4 hours, or 1 day), or an appointment on the calendar was scheduled to end no more than some predetermined amount of time earlier than the current time (e.g., 1 minute, 5 minutes, 30 minutes, 1 hour, 4 hours, or 1 day);
- user input indicates that: an activation state of a component (e.g., profile or logic module) should be changed, a timer should be started or stopped, a timer should have a specified duration, The items on the list above correspond to the context sensors 206a-i, but omit the user input sensor 206j because user input may contribute to or override any condition. For example, input received from a user may override the time sensor 206a by manually specifying a time other than the current time, in which case the context controller 204 may treat the time specified by the user as the current time instead of the time otherwise sensed by the time sensor 206a. As another example, the user may manually specify a location other than the user's actual current location, in which case the context controller 204 may treat the location specified by the user as the current location instead of the location otherwise sensed by the location sensor 206f.

As described above, any aspect of context data 202 may satisfy the condition specified by a logic module. In the particular example of FIG. 5, each logic module specifies at least one condition that is satisfied by a message transmissible via a particular communication mode. A message that satisfies such a condition is referred to below as a "triggering message." Action specifiers, such as action specifiers 510a-c in FIG. 5, may, for example, specify actions such as the following:

Block. Blocking a message may include any one or more of the following: preventing the message from being sent, placed in an output queue to be sent, provided to a software component adapted to send messages, created, edited, manifested, received, or downloaded. Blocking a message may include any one or more of the following: preventing a notification of the message from being generated, transmitted, or manifested.

Allow. Allowing a message may include, for example, not taking any action in connection with the message. As a result, associating an "allow" action type with a particular communication mode may have the same effect as deactivating the logic module whose condition is satisfied by messages transmissible via the communication mode, and may be implemented using the same techniques as deactivating the logic module whose condition is satisfied by messages transmissible via the communication mode. The effect of applying an "allow" action to a particular message may be that the message is acted upon (e.g., by a system external to the message control system 100) in a manner that is the same as or equivalent to the manner in which the message would have been acted upon if the message control system 100 were not present.

Forward. Forwarding a message may, for example, include transmitting the message to a new destination (e.g., user or device) that differs from the original destination of the message. The new destination may, for example, be explicitly specified by the action specifier, or be derived from a rule (e.g., "forward messages addressed to a recipient to that recipient's administrative assistant"). Optionally, forwarding a message may also include blocking the message. For example, forwarding an email message originally transmitted to a first user may include blocking the email message from being received by the first user and transmitting the email message to a second user.

Defer. Deferring a message may, for example, include blocking the message until a timer elapses or until a predetermined criterion is satisfied (e.g., until a predetermined time occurs) and then allowing the message. Deferral, therefore, is equivalent to and may be implemented using the same techniques as blocking followed by allowing. The deferral period may, for example, be explicitly specified by the action specifier or be derived by a process from the current context (e.g., "on weekdays, defer personal messages until 5 pm").

Change mode. Changing the mode of a message may, for example, include transmitting a message using a new mode that differs from the original mode by which the message was transmitted. For example, a message that was received at an email server using an email protocol may be transmitted to the recipient user or device using a text messaging protocol, either instead of or in addition to transmitting the message to the recipient user or device using an email messaging protocol. As this example illustrates, changing the mode of a message may include blocking the message. Changing the mode of a message may be implemented using the same techniques as forwarding a message but with the mode of the message changed.

Change contents. Changing the contents of a message may, for example, include modifying the contents of the message to produce a modified message and transmitting the modified message, either instead of or in addition to the original message. For example, an error message containing a numerical error code may be modified to include an English-language description that is easier for the recipient user to understand. Changing the contents of a message may be implemented using similar techniques to changing the mode of a message.

Respond. Responding to an original message may include sending a response message to the original message, either via the same or different communication mode from the original message. Optionally, responding to an original message may include blocking or deferring the original message. The contents of the response may, for example, be specified explicitly by the action specifier, or be derived by a process from the current context (e.g., "I am in a scheduled meeting until 4:00 pm and cannot respond to your email message until at least 4:15 pm").

Any of the types of actions listed above may, for example, include: (1) performing the action on a particular triggering message in response to detection of the triggering message; or (2) initiating performance of the action on current and future messages (e.g., messages transmissible via the same communication mode as the triggering message, or transmissible via communication modes that differ from the communication mode of the triggering messages) until a future time (e.g., until the elapse of a timer, until a predetermined time occurs, or until some other condition is satisfied).

Although some of the examples of actions described herein are actions that are applied to messages, this is not a limitation of the present invention. An action may be applied to an object other than a message. Examples of actions include, but are not limited to:

launching, logging into, exiting, or logging out of one or more applications, web sites, or accounts;

opening or closing files;

opening, displaying, closing, hiding, enabling, disabling, changing the display order of (e.g., bringing to the front or sending to the back), or changing the opacity, transparency, color, or emphasis of any one or more GUI elements (e.g., windows, menus, dialog boxes, taskbars, or buttons);

changing the state of a device, such as by turning on, shutting off, or changing the volume, brightness, contrast, or volume of a device;

enabling or disabling input devices (such as keyboards, mice, touchpads, touchscreens, microphones, or network adapters) or output devices (such as monitors, screens, speakers, printers, or network adapters).

An action specifier (such as any of the action specifiers 510*a-c*) may specify not only an action to perform but also the object of the action (i.e., the object to which the action is to be applied). The action specifier may, for example, include an object specifier (not shown) that specifies the object of the action. The object specifier may specify the object(s) of the action using a "condition" as that term is used herein, in which case the object(s) of the action may be selected as the object(s) that satisfy the condition.

If an action specifier does not specify an object of the action, then the object of the action may be identified in other ways, such as by identifying a default object or an object specified by another action specifier. For example, in various embodiments disclosed herein, the object of an action may be identified as the message that satisfied the condition that triggered the action and/or messages transmissible via the same communication mode as the triggering message.

Certain actions may be particularly useful to perform in connection with particular communication modes, such as:

Voice calls. For incoming calls: turning off the telephone ringer, changing (e.g., lowering) the ringer volume, changing the ring type (e.g., to vibrate or alarm), changing the ring tone (e.g., from a musical tone to a beeping or ringing tone), forwarding incoming calls directly to voicemail so that the telephone does not ring, putting the caller on hold, and disabling manifestation of notification of incoming voice calls. For outgoing calls: preventing the user from initiating outgoing calls (e.g., by disabling the dial pad, touchscreen, and/or other input means on the telephone) and queuing outgoing calls so that the user's speech is recorded and queued to be sent but deferred until outgoing voice calls are activated, at which point the outgoing call is automatically made and the user's recorded speech is transmitted on the call.

Email messages. For incoming email messages: preventing downloading of incoming email messages (or headers or other indications of incoming email messages) from an email server to an email client (optionally even if the user provides a manual instruction to download email, and optionally even if the email client is otherwise scheduled to download incoming email), allowing downloading of incoming email messages from the email server but preventing storing of the email messages in the recipient's email inbox, allowing downloading of incoming email messages from the email server and storing them in a folder within the recipient's email inbox, allowing incoming email messages to be added to the recipient's email inbox but preventing manifestation of a notification of such messages, preventing the user's inbox (or the bodies of messages contained in the inbox) from being manifested, preventing the user from issuing a command to receive email (such as by disabling a "send/receive" button), and exiting from (i.e., terminating) one or more email clients. For outgoing email, preventing new email messages from being created, edited, sent, and/or queued to be sent; in response to queuing of an outgoing email message to be sent, deferring sending of the email message (e.g., until blocking of sending email is deactivated); and exiting from (e.g., terminating) one or more email clients.

The ability of modern computing and communication devices to multitask (i.e., to engage in multiple tasks simultaneously or apparently simultaneously) can be beneficial, but can also reduce the efficiency of the devices' users at achieving desired results. To address this problem, certain embodiments of the present invention enforce unitasking (the performance of only one task at a time) on devices that otherwise are capable of multitasking.

Figure 7A:
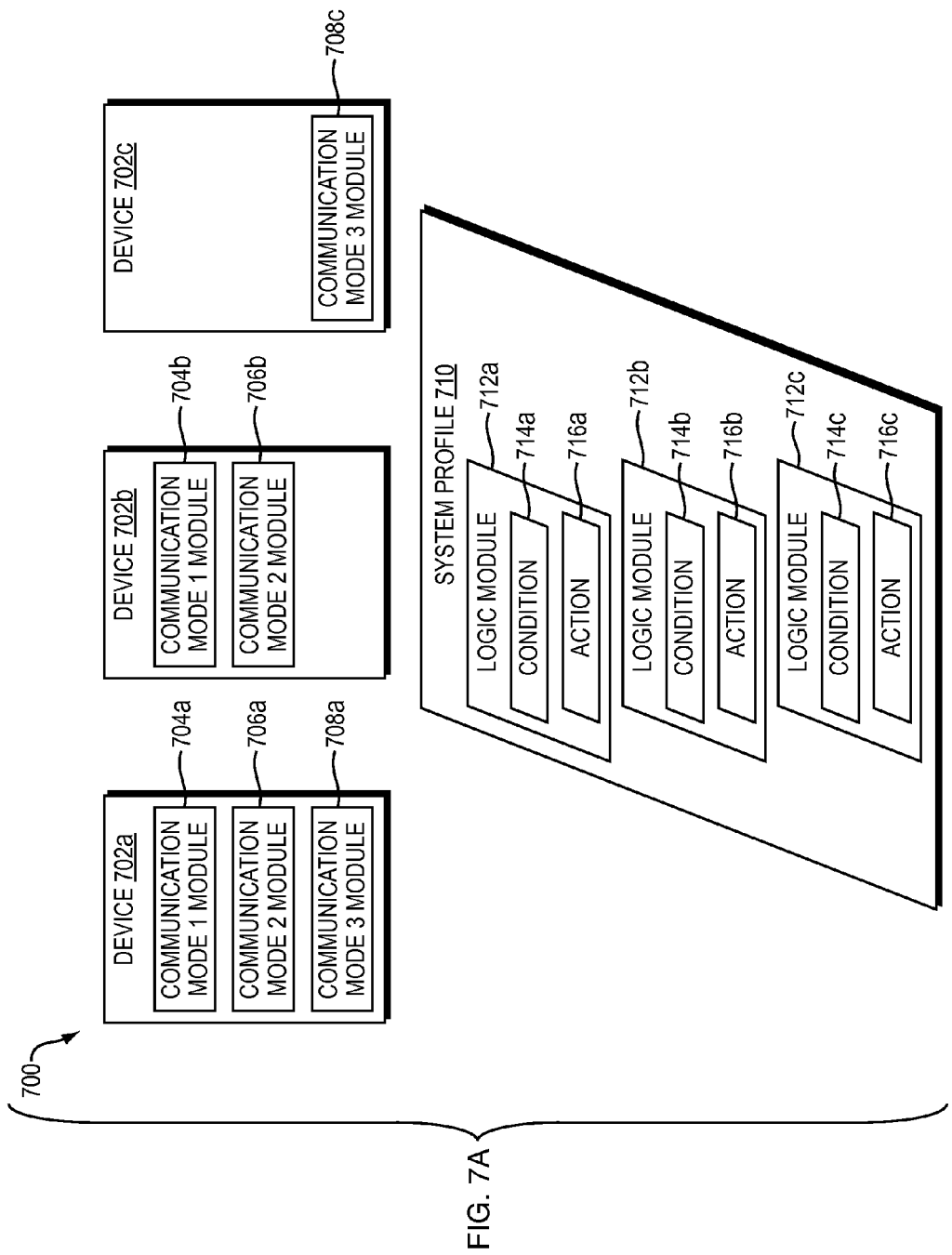
FIG. 7A is a diagram illustrating use of an embodiment of the present invention to enforce communication unitasking among one or more devices according to one embodiment of the present invention.

For example, referring to FIG. 7A, a diagram is shown of a system 700 including a plurality of devices 702a-c. Such devices 702a-c may include any of the components disclosed herein, but are only illustrated to contain certain components for ease of illustration. In particular, device 702a includes a communication mode module 704a which is capable of transmitting messages via a first communication mode, a communication mode module 706a which is capable of transmitting messages via a second communication mode, and a communication mode module 708a which is capable of transmitting messages via a third communication mode. No two of the first, second, and third communication modes are the same as each other.

Device 702b includes a communication mode module 704b which is capable of transmitting messages via the first communication mode and a communication mode module 706b which is capable of transmitting messages via the second communication mode. Device 702c includes a communication mode module 708c which is capable of transmitting messages with the third communication mode. The first, second, and third communication modes may, for example, be email, text messaging, and voice call communication modes.

The particular number and combination of devices, communication modes, and communication mode modules shown in FIG. 7A is merely an example and not a limitation of the present invention. For example, the system 700 may include fewer or greater than three communication devices (e.g., one or two communication devices). Furthermore, the number of communication modes represented by the communication mode modules in the system 700c may be any number greater than or equal to two. The particular distribution of communication mode modules among the devices 702a-c is also merely an example.

Each of communication mode modules 704a-b, 706a-b, 708a, and 708c may, for example, be hardware, a computer program, or any combination thereof. For example, an email communication mode module may include any combination of one or more of the following: email client software, one or more input devices for receiving email input (e.g., keyboard or touchscreen), one or more output devices for providing email output (e.g., monitor, touchscreen, or speakers), and one or more network communication devices (e.g., wired or wireless network card).

Multiple communication mode modules within a single device may be capable of executing in parallel with each other or substantially in parallel with each other (e.g., by utilizing multi-tasking capabilities of the device). For example, communication mode modules 704a, 706a, and 708a may be capable of executing in parallel with each other on device 702a, so that they can perform their communication mode-related functions in parallel with each other.

The system 700 also includes a system profile 710 that is associated with all of the devices 702a-c. The system profile 710 includes at least two logic modules; three such logic modules 712a-c are shown in FIG. 7A for purposes of example. Although the logic modules 712a-c may specify any conditions and any actions, a particular set of conditions and actions will now be described that may be used to enforce communication mode unitasking on and/or across the devices 702a-c. The term "communication mode unitasking" refers herein to engaging in (e.g., composing, reading, or transmitting) communication of messages transmissible via only one communication mode at any particular time. For example, the system 700c may prevent users of the system 700c from: (1) engaging in text messaging or voice call communication while engaged in email communication; (2) engaging in email communication or text messaging communication while engaged in voice call communication; and (3) engaging in voice call communication or email communication while engaged in text messaging communication. The system 700 may allow the user to switch from unitasking in connection with a first communication mode to unitasking in connection with a second communication mode; this is referred to here as "sequential communication mode unitasking."

Communication mode unitasking may, for example, be implemented by configuring any two or more of logic modules 712a-c as follows: (1) the conditions 714a of logic module 712a are satisfied by detection of an email message; (2) the action 716a of logic module 712a blocks text messages and voice calls; (3) the conditions 714b of logic module 712b are satisfied by detection of a voice call; (4) the action 716b of logic module 712b blocks email messages and text messages; (5) the conditions 714c of logic module 712c are satisfied by the detection of a text message; and (6) the action 716c of logic module 712c blocks email messages and voice calls.

Figure 8A:
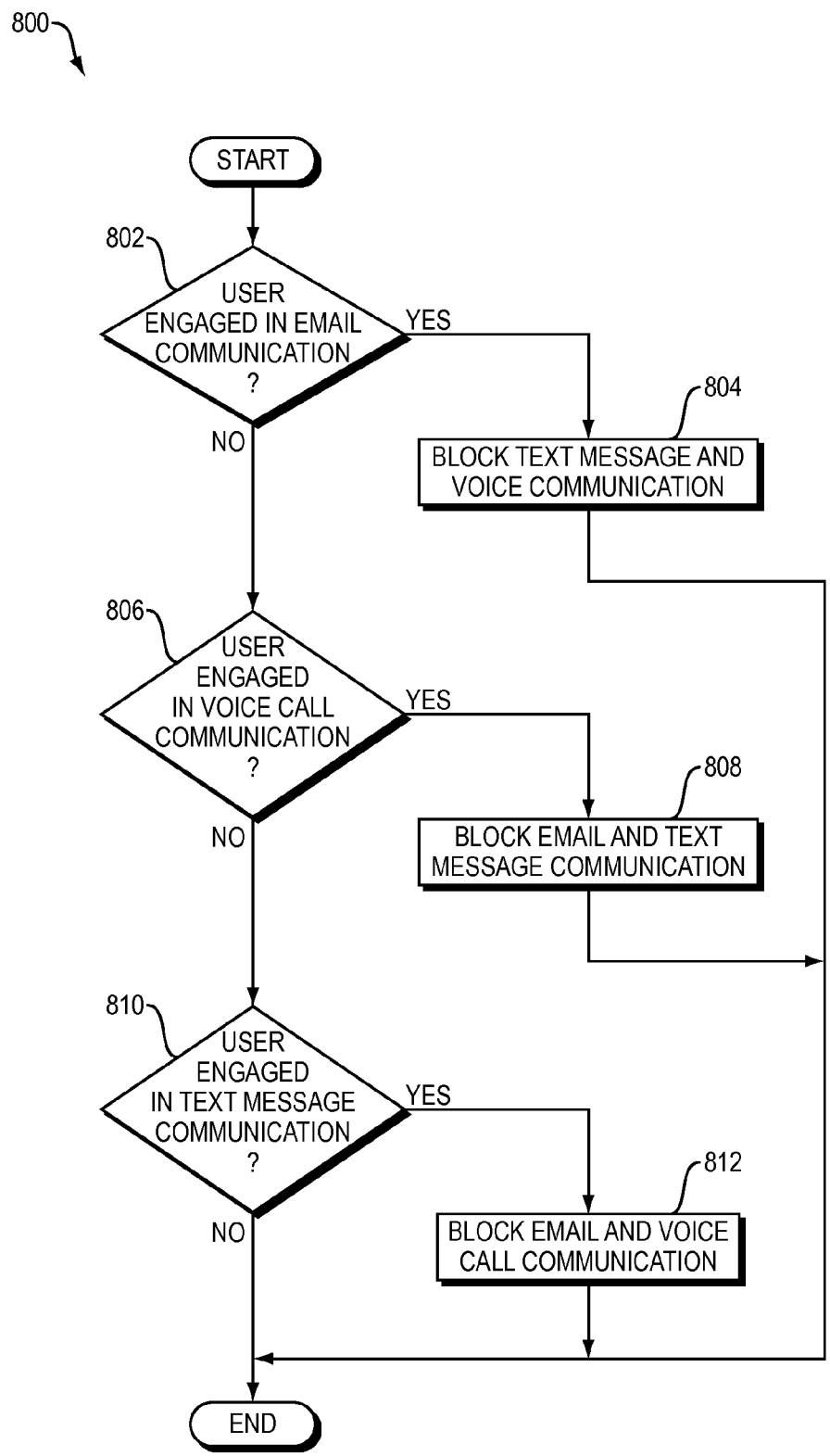
FIG. 8A is a flowchart of a method performed by the system of FIG. 7A according to one embodiment of the present invention.

An effect of implementing the system 700 is illustrated by the method 800 of FIG. 8A, which may be performed by the system 700 by applying the techniques disclosed herein. The method 800 determines whether any of the devices 702*a-c* associated with the system profile 710 is engaged in email communication (operation 802), such as by analyzing the context data 202 to detect whether any of the devices 702*a-c* is composing, manifesting, or transmitting an email message. If any of the devices 702*a-c* is engaged in email communication, then the method 800 blocks text message communication and voice call communication on all of the devices 702*a-c* (operation 804).

The method 800 determines whether any of the devices 702*a-c* associated with the system profile 710 is engaged in voice communication (operation 806). If any of the devices 702*a-c* is engaged in voice communication, then the method 800 blocks email communication and text message communication on all of the devices 702*a-c* (operation 808). Finally, the method 800 determines whether any of the devices 702*a-c* associated with the system profile 710 is engaged in text message communication (operation 810). If any of the devices 702*a-c* is engaged in text message communication, then the method 800 blocks email communication and voice call communication on all of the devices 702*a-c* (operation 812).

The system 700 may block messages transmissible via a particular communication mode by, for example, performing any one or more of the following in connection with the communication mode module(s) in the system 700 that are capable of transmitting messages via the particular communication mode (the "blocked communication mode modules"): (1) disabling or shutting down the blocked communication mode modules; (2) intercepting incoming messages addressed to the blocked communication mode modules and preventing the intercepted messages from being provided to the blocked communication mode modules; (3) intercepting outgoing messages attempted to be sent by the blocked communication mode modules and preventing the intercepted messages from being provided to their intended destinations; (4) preventing the blocked communication mode modules from being used to compose messages of the corresponding communication mode; and (5) preventing the blocked communication mode modules from manifesting messages of the corresponding communication mode.

The blocking of a communication mode performed by FIG. 7A in method 800 may, but need not, include blocking of all messages transmissible via the communication mode, or blocking of all activities performed in connection with messages transmissible via the communication mode. For example, such blocking may include only blocking of incoming messages, only blocking of outgoing messages, only blocking of composing of messages, or only blocking of manifesting messages.

The blocking of a communication mode performed by FIG. 7A in method 800 may continue until manually discontinued in response to user input, or until the context data 202 satisfies some predetermined condition (such as the lapse of a timer). For example, a user of the devices 702*a-c* may engage in communication of a first communication mode (e.g., email) and thereby cause the system 700 to block communications of the remaining communication modes (e.g., text message and voice calls). The system 700 may block incoming communications of the blocked communication modes unless and until the user of the devices 702*a-c* engages in activity related to one of the blocked communication modes, such as composing a message transmissible by one of the blocked communication modes or viewing an inbox of messages transmissible by one of the blocked communication modes. The system 700 may detect such activity by the user and treat it as an input to method 800, i.e., as an indication that the user now wants to unitask in the newly-engaged communication mode. In response, the system 700 may allow messages transmissible via the new communication mode but block messages transmissible via the remaining communication modes. In this way, the user may engage in sequential unitasking with a minimum of effort.

As another example, the system 700 may not allow the user to manually discontinue unitasking in connection with a particular communication mode. Instead, the system 700 may be configured only to discontinue unitasking entirely, or to discontinue unitasking in connection with one communication mode and initiate unitasking in connection with another communication mode, in response to satisfaction of a predetermined condition by the context 202, where the predetermined condition is not based on user input (or at least that the predetermined condition is not based on user input provided by the user at or around the time at which the system 700 determines whether the predetermined condition is satisfied). In such an embodiment, the system 700 may or may not allow the user to effectively discontinue unitasking by changing the activation state of the system profile 710 and/or of other profiles in the system 700.

As another example, the actions defined by logic modules 712*a-c* may be "change mode" rather than block. As a result, in response to detecting that the user is engaged in email communication, the system 700 may perform a "change mode to email" action in connection with any messages transmissible via other communication modes (e.g., text messaging and voice calls) that the system 700 detects while the system 700 is unitasking in connection with email. Any incoming text messages received during this time may, therefore, be converted into email messages and delivered to the user's email inbox, and any incoming voice calls received during this time may, therefore be converted (using an automated speech recognition engine) into email messages and delivered to the user's email inbox (possibly in addition to storing a recording of the voice call as a voicemail message in the user's voicemail inbox). Similarly, in response to detecting that the user is engaged in live voice call communication, the system 700 may perform a "change mode to voice call" action in connection with any messages transmissible via other communication modes (e.g., text messaging and email) that the system 700 detects while the system 700 is unitasking in connection with live voice calls. Any incoming text messages or email messages received during this time may, therefore, be converted (using a text-to-speech engine) into live voice calls and/or voicemail messages that are delivered to the user. Similar techniques may be applied when the user is unitasking in connection with text messages.

Communication mode unitasking is merely one example of "enforced unitasking," as that term is used herein. Embodiments of the present invention may engage in enforced unitasking by limiting a system (e.g., a computing device or software) to performing only a subset of the set of tasks that the system inherently is capable of performing. The subset may include one, two, three, or any number of tasks fewer than the total number of tasks that the system inherently is capable of performing.

For example, referring to FIG. 7B, a diagram is shown of a system 720 including a plurality of computing devices 722*a-c*. Such devices 722*a-c* may include any of the components disclosed herein, but are only illustrated to contain certain components for ease of illustration. In particular, device 722*a* includes a first task module 724*a* which is capable of performing a first task, a second task module 726*a* which is capable of performing a second task, and a third task module 728*a* which is capable of performing a third task. No two of the first, second, and third tasks are the same as each other.

Device 722*b* includes a first task mode module 724*b* which is capable of performing the first task and a second task mode module 726*b* which is capable of performing the second task. Device 722*c* includes a third task module 728*c* which is capable of performing the third task.

The particular number and combination of devices and task modules shown in FIG. 7B is merely an example and not a limitation of the present invention. For example, the system 720 may include fewer or greater than three computing devices (e.g., one or two computing devices). Furthermore, the number of tasks represented by the task modules in the system 700 may be any number greater than or equal to two. The particular distribution of task modules among the devices 722*a-c* is also merely an example.

Each of task modules 724*a-b*, 726*a-b*, 728*a*, and 728*c* may, for example, contain or otherwise be associated with one or more hardware components, one or more computer programs, or any combination thereof. In other words, a particular task module may contain or otherwise be associated with any combination of hardware and/or software components for performing the particular task associated with the task module. A component of a task module need not be a standalone product. Rather, for example, a component of a task module may be a component or subset of a product. For example, if task module 724*a* is associated with the task of transmitting email messages, then task module 724*a* may include: (1) a computer program for transmitting email; and (2) an email client component of a web browser. Although task modules 724*a*, 724*b*, and 724*c* are associated with distinct tasks, the contents of task modules 724*a*, 724*b*, and 724*c* may overlap with each other. For example, if task module 724*a* is associated with the task of transmitting email messages and task module 724*b* is associated with the task of creating appointments on a calendar, then task modules 724*a* and 724*b* may contain (or otherwise be associated with) a computer program that includes both means for transmitting email messages and means for creating calendar appointments.

Multiple task modules within a single device may be capable of executing in parallel with each other or substantially in parallel with each other (e.g., by utilizing multitasking capabilities of the device). For example, task modules 724*a*, 726*a*, and 728*a* may be capable of executing in parallel with each other on device 722*a*, so that they can perform their respective tasks in parallel with each other.

The term "task," as that term is used herein, may refer, for example, to any one or more of the following:

transmitting or attempting to transmit any message (e.g., sending a message and/or receiving a message), or transmitting or attempting to transmit a message that satisfies a particular condition;

manifesting or attempting to manifest a message or a notification of a message;

creating a new message or attempting to create a new message;

editing an existing message or attempting to edit an existing message;

using a particular device for any purpose, or using a device to perform a task that satisfies a particular condition;

using a particular component (e.g., a particular input component or a particular output component) of a device for any purpose, or using a component of a device to perform a task that satisfies a particular condition;

using a particular application for any purpose, or using a particular application to perform a task that satisfies a particular condition;

using a particular user interface element for any purpose, or using a particular user interface element to perform a task that satisfies a particular condition.

The system 720 also includes a system profile 730 that is associated with all of the devices 722*a-c*. The system profile 730 includes at least two logic modules; three such logic modules 732*a-c* are shown in FIG. 7B for purposes of example. Although the logic modules 732*a-c* may specify any conditions and any actions, a particular set of conditions and actions will now be described that may be used to enforce unitasking on and/or across the devices 722*a-c*. In particular, the system 720 may prevent users of the system 720 from: (1) performing the second and third tasks (i.e., the tasks associated with task modules 726*a* and 728*b*, respectively) while performing the first task (i.e., the task associated with task module 704*a*); (2) performing the first and third tasks (i.e., the tasks associated with task modules 704*a* and 708*a*, respectively) while performing the second task (i.e., the task associated with task module 706*a*); and (3) performing the first and second tasks (i.e., the tasks associated with task modules 704*a* and 706*a*, respectively) while performing the third task (i.e., the task associated with task module 708*a*). The system 720 may allow the user to switch from unitasking in connection with one task to unitasking in connection with another task; this is referred to here as "sequential enforced unitasking."

Sequential enforced unitasking may, for example, be implemented by configuring any two or more of logic modules 732*a-c* as follows: (1) the condition 734*a* of logic module 732*a* is satisfied by detecting that any of the devices 722*a-c* is performing the first task; (2) the action 736*a* of logic module 732*a* prevents devices 702*a-c* from performing either or both of the second and third tasks (such as by disabling and/or reconfiguring task modules 706*a*, 708*a*, 706*b*, and 708*c*); (3) the condition 734*b* of logic module 732*b* is satisfied by detecting that any of the devices 722*a-c* is performing the second task; (4) the action 736*b* of logic module 732*b* prevents devices 702*a-c* from performing either or both of the first and third tasks (such as by disabling and/or reconfiguring task modules 704*a*, 708*a*, 704*b*, and 708*c*); (5) the condition 734*c* of logic module 732*c* is satisfied by detecting that any of the devices 722*a-c* is performing the third task; and (6) the action 736*c* of logic module 732*c* prevents devices 702*a-c* from performing either or both of the first and second tasks (such as by disabling and/or reconfiguring task modules 704*a*, 706*a*, 704*b*, and 706*b*).

Figure 8B:
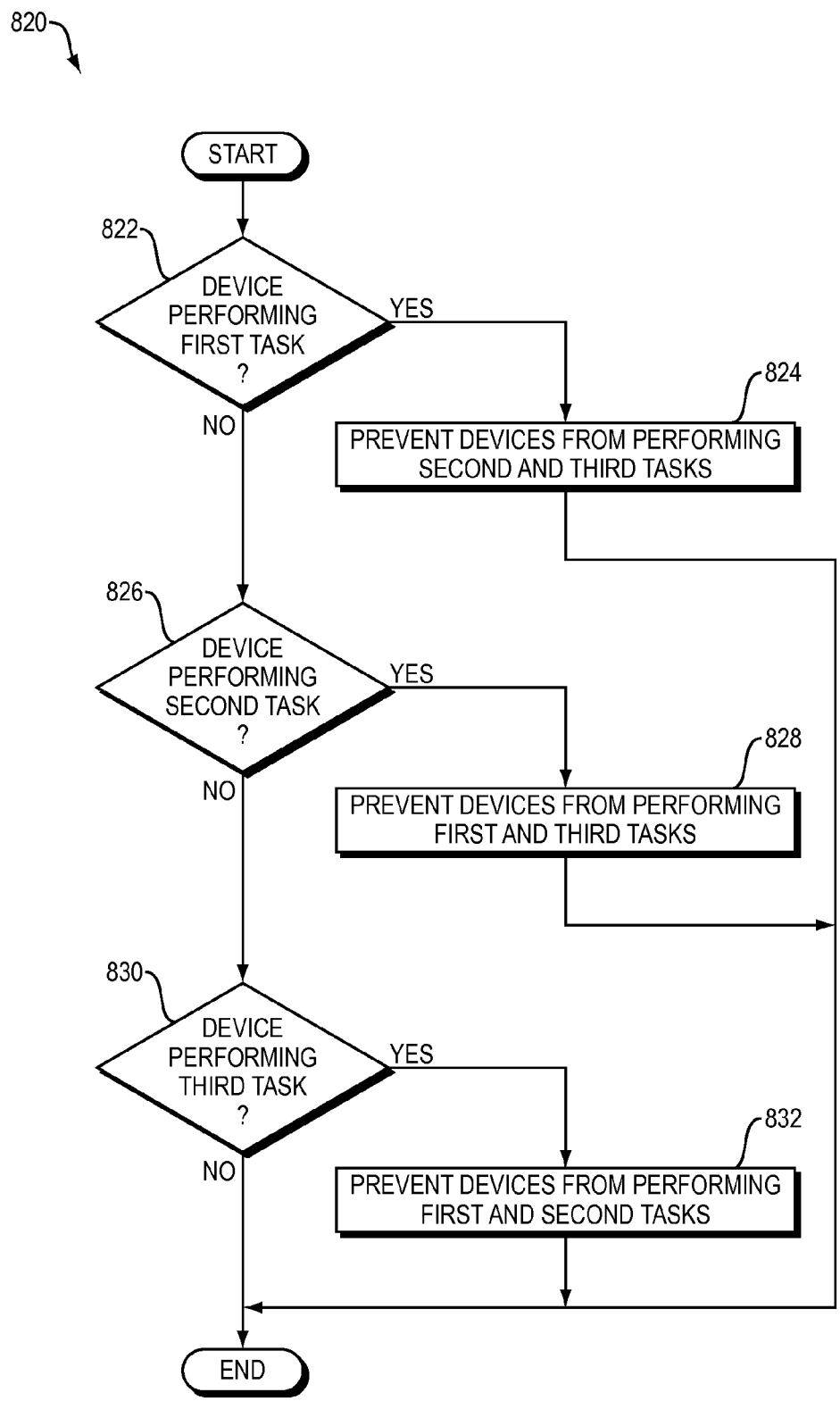
FIG. 8B is a flowchart of a method performed by the system of FIG. 7B according to one embodiment of the present invention.

An effect of implementing the system 720 is illustrated by the method 820 of FIG. 8B, which may be performed by the system 720 by applying the techniques disclosed herein. The method 820 determines whether any of the devices 722*a-c* associated with the system profile 730 is performing the first task (operation 822), such as by analyzing the context data 202 to detect whether any of the devices 722*a-c* is performing the first task. If any of the devices 722*a-c* is performing the first task, then the method 820 prevents the devices 722*a-c* from performing the second or third tasks (operation 824).

The method 820 determines whether any of the devices 722*a-c* associated with the system profile 730 is performing the second task (operation 826), such as by analyzing the context data 202 to detect whether any of the devices 722*a-c* is performing the second task. If any of the devices 722*a-c* is performing the second task, then the method 820 prevents the devices 722*a-c* from performing the first or third tasks (operation 828).

The method 820 determines whether any of the devices 722a-c associated with the system profile 730 is performing the third task (operation 830), such as by analyzing the context data 202 to detect whether any of the devices 722a-c is performing the third task. If any of the devices 722a-c is performing the third task, then the method 820 prevents the devices 722a-c from performing the first or second tasks (operation 832).

Once the method 800 of FIG. 8B has begun to prevent one or more tasks from being performed, the method 800 may continue to prevent such tasks from being performed until such prevention is discontinued by the method 800 in response to input provided manually by a user, or until the context data 202 satisfies some predetermined condition (such as the lapse of a timer, a change in location, or a change in speed).

As another example, the system 720 may not allow the user to manually discontinue unitasking in connection with a particular task. Instead, the system 720 may be configured only to discontinue unitasking entirely, or to discontinue unitasking in connection with one task and initiate unitasking in connection with another task, in response to satisfaction of a predetermined condition by the context 202, where the predetermined condition is not based on user input (or at least that the predetermined condition is not based on user input provided by the user at or around the time at which the system 720 determines whether the predetermined condition is satisfied). In such an embodiment, the system 720 may or may not allow the user to effectively discontinue unitasking by changing the activation state of the system profile 730 and/or of other profiles in the system 720.

In the embodiment illustrated by FIGS. 7B and 8B, detection of the performance of a single task within a set of tasks causes the performance of all other tasks in the set to be prevented. This is merely one example and does not constitute a limitation of the present invention. Alternatively, for example, the detection of the performance of any one or more tasks may cause any one or more other tasks to be prevented. For example, referring to FIG. 7C, a diagram is shown of a plurality of unitasking specifiers 740a-c, each of which specifies one or more tasks to be prevented in response to detection of the performance of one or more other tasks.

More specifically, unitasking specifier 740a includes a triggering task list 742a, which specifies the task(s) that trigger the unitasking specifier 740a, and a prevented task list 746a, which specifies the task(s) that are prevented from being performed when the unitasking specifier 740a is triggered. In particular, the triggering task list 742a includes a single triggering task specifier 744a, which may specify any task. Furthermore, the prevented task list 746a includes three prevented task specifiers 748a-c, which may specify any three distinct tasks. The method 820 of FIG. 8B may be generalized so that operation 822 determines whether any of the devices 722a-c is performing any of the tasks specified by the triggering task list 746a, and so that operation 824 prevents the devices 722a-c from performing any of the tasks specified by the prevented task list 746a.

Unitasking specifier 740b includes a triggering task list 742b and a prevented task list 746b. In particular, the triggering task list 742b includes a first triggering task specifier 754a and a second triggering task specifier 754b, which may specify any two distinct tasks. Furthermore, the prevented task list 746b includes three prevented task specifiers 758a-c, which may specify any three distinct tasks. The method 820 of FIG. 8B may be generalized so that operations 826 and 828 apply to the triggering task list 742b and the prevented task list 746b, respectively.

Finally, unitasking specifier 740c includes a triggering task list 742c and a prevented task list 746c. In particular, the triggering task list 742c includes a first triggering task specifier 764a and a second triggering task specifier 764b, which may specify any two distinct tasks. Furthermore, the prevented task list 746b includes a single prevented task specifier 768a, which may specify any task. The method 820 of FIG. 8B may be generalized so that operations 830 and 832 apply to the triggering task list 742c and the prevented task list 746c, respectively.

As the examples in FIG. 7C illustrate, there may be a one-to-one, one-to-many, many-to-one, or many-to-many relationship between the tasks in the triggering task list of a unitasking specifier and the tasks in the prevented task list of that unitasking specifier. Furthermore, the triggering task list and the prevented task list of a particular unitasking specifier may be disjoint; in other words, the triggering task list may contain no tasks that are in the prevented task list, and the prevented task list may contain no tasks that are in the triggering task list.

Furthermore, the union of the triggering task list and the prevented task list of a particular unitasking specifier may specify fewer than all of the tasks that a particular one of the devices 722a-c in the system 720 (or the set of devices 722a-c in the system) is capable of performing. For example, the union of triggering task list 742a and prevented task list 746a may specify a set of tasks that does not include the task associated with task modules 728a and 728c in FIG. 7B. As a result, when the system 720 applies the unitasking specifier 740 to prevent the tasks specified by the prevented task list 746a from being performed by the devices 722a-c, such prevention may not include preventing task modules 728a and 728c from performing their associated task. As a result, task modules 728a and 728c may continue to perform their associated task even while the system 720 and method 820 prevent task modules 724a, 726a, 724b, and 726b from performing their respective tasks.

Unitasking-based features of embodiments disclosed herein may be used in connection with any other embodiments disclosed herein. Unitasking-based features of embodiments disclosed herein may, however, be used independently of various features disclosed herein. For example, unitasking-based features of embodiments disclosed herein may be used in connection with profiles or without the use of profiles.

Figure 9A:
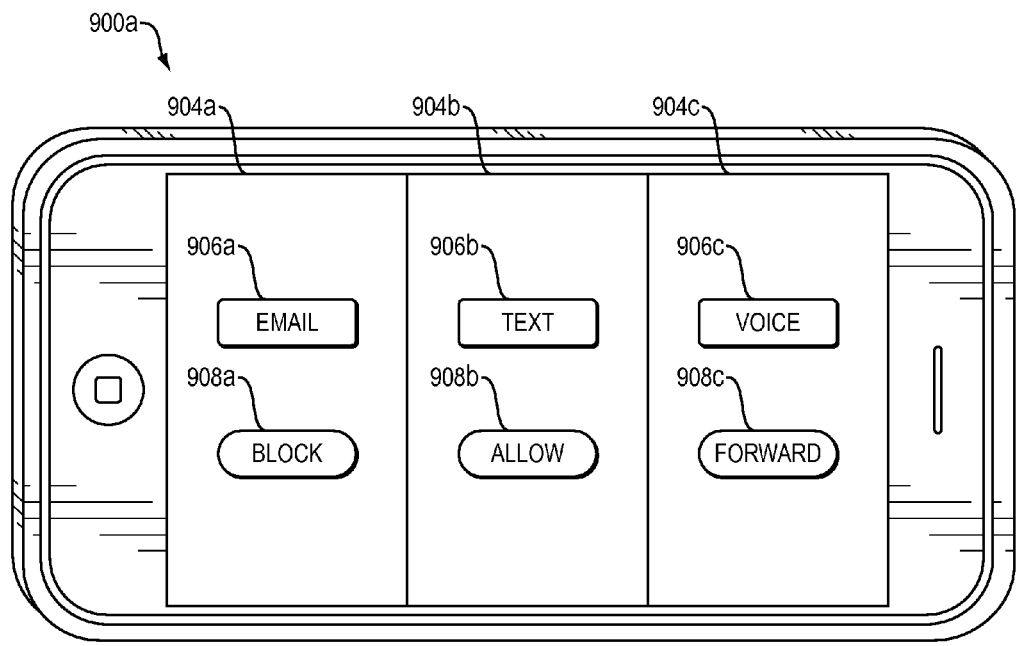
FIGS. 9A-9D are illustrations of user interfaces for interacting with profiles and logic modules according to one embodiment of the present invention.

Referring FIG. 9A, an example of a user interface 900a representing a particular profile (e.g., the system profile 710 in FIG. 7A) is shown. This and other users interfaces disclosed herein are merely examples and not limitations of the present invention. The user interface 900a includes a first mode section 904a representing a first logic module (e.g., logic module 712a) having a first condition that is satisfied by a first communication mode; a second mode section 904b representing a second logic module (e.g., logic module 712b) having a second condition that is satisfied by a second communication mode; and a third mode section 904c representing a third logic module (e.g., logic module 712c) having a third condition that is satisfied by a third communication mode. In the example of FIG. 9A, the three communication modes are email, text messaging, and voice calls. In particular:

the first mode section 904a includes: (1) a mode identification element 906a indicating the mode that satisfies the condition specified by condition specifier 714a; and (2) a manifestation of the first mode action represented by the first mode action specifier 716a, namely an element 908a in the form of a circle containing the word "block";

the second mode section 904*b* includes: (1) a mode identification element 906*b* indicating the mode that satisfies the condition specified by condition specifier 714*b*; and (2) a manifestation of the first mode action represented by the first mode action specifier 716*b*, namely an element 908*b* in the form of a circle containing the word "allow"; and the third mode section 904*c* includes: (1) a mode identification element 906*c* indicating the mode that satisfies the condition specified by condition specifier 714*c*; and (2) a manifestation of the first mode action represented by the first mode action specifier 716*c*, namely an element 908*c* in the form of a circle containing the word "forward."

The user interface 900*a*, therefore, represents the contents of the corresponding profile at a particular time. The user interface 900*a* may also be used to receive user input for modifying the contents of the corresponding profile. In other words, the user interface 900*a* may be a mechanism for receiving, from a user, input to provide to a profile controller and thereby to cause the profile controller to modify the contents of the profile based on the input, as disclosed above in connection with FIGS. 1G and 3B.

For example, the user may provide input through the user interface 900*a* to modify the first condition specifier 714*a* by:
- editing the text of the first mode identification element 906*a* to specify a communication mode that differs from the communication mode currently specified by the first mode specifier 906*a* (e.g., by editing the text "Email" to read "Fax");
- selecting the first mode identification element 906*a*, thereby causing a drop-down list of available communication modes to be displayed, and by then selecting an alternate communication mode (e.g., "Fax") from the list; or
- selecting (e.g., clicking on) the first mode identification element 906*a* one or more times, thereby causing labels of available communication modes (e.g., "Email," "Text," "Voice," "Fax") to be manifested sequentially in response to each selection, until a label of the communication mode desired by the user is manifested.

Similarly, the user may, for example, provide input to the user interface 900*a* to modify the first action specifier 716*a* by:
- selecting the first mode action element 908*a*, thereby causing a drop-down list of available actions (e.g., "Block," "Allow," "Forward," and "Defer") to be displayed, and then selecting an alternate action (e.g., "Allow") from the list; or
- selecting (e.g., clicking on) the first mode action element 908*a* one or more times, thereby causing labels of available actions (e.g., "Allow," "Forward," "Defer," and "Block") to be manifested sequentially in response to each selection, until a label of the action desired by the user is manifested.

Figure 9B:
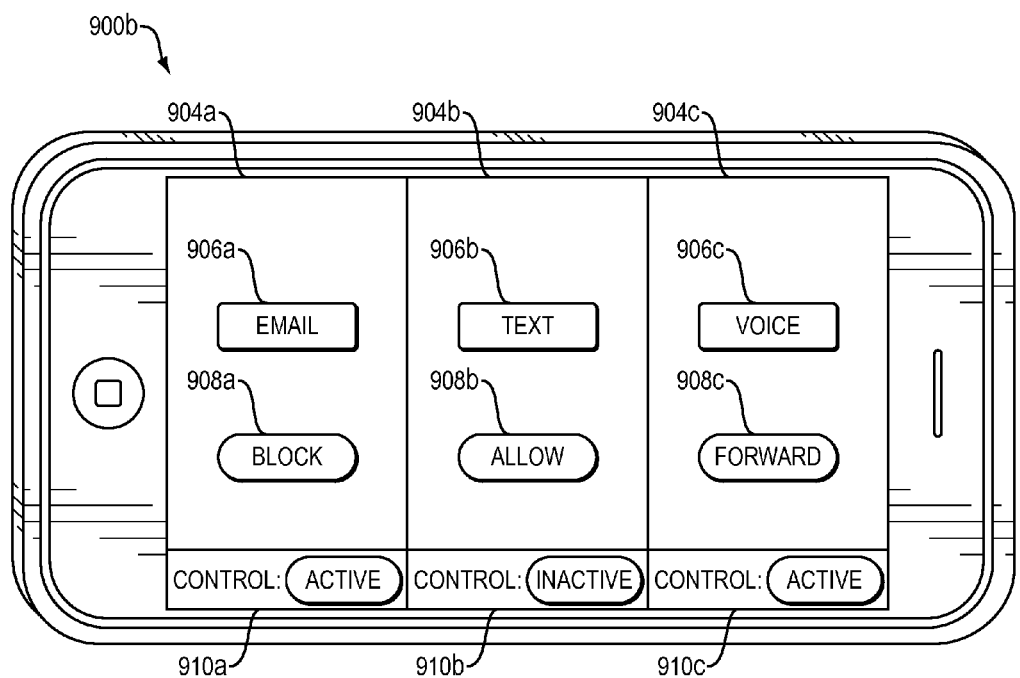

If individual logic modules in a profile have activation states (as in the case of FIG. 5B), such a profile may be manifested by the user interface 900*b* of FIG. 9B. The user interface 900*b* of FIG. 9B is similar to the user interface 900*a* of FIG. 9A, except that the user interface 900*b* of FIG. 9B includes first mode activation element 910*a*, which manifests an activation state of its corresponding logic module; second mode activation element 910*b*, which manifests an activation state of its corresponding logic module; and third mode activation element 910*c*, which manifests an activation state of its corresponding logic module. To modify the activation states of the first corresponding logic module, the user may select (e.g., click on) first mode activation element 910*a*, in response to which the corresponding logic module controller may toggle the value of the corresponding activation state specifier from its current value (e.g., "active") to its alternate value (e.g., "inactive").

Figure 9C:
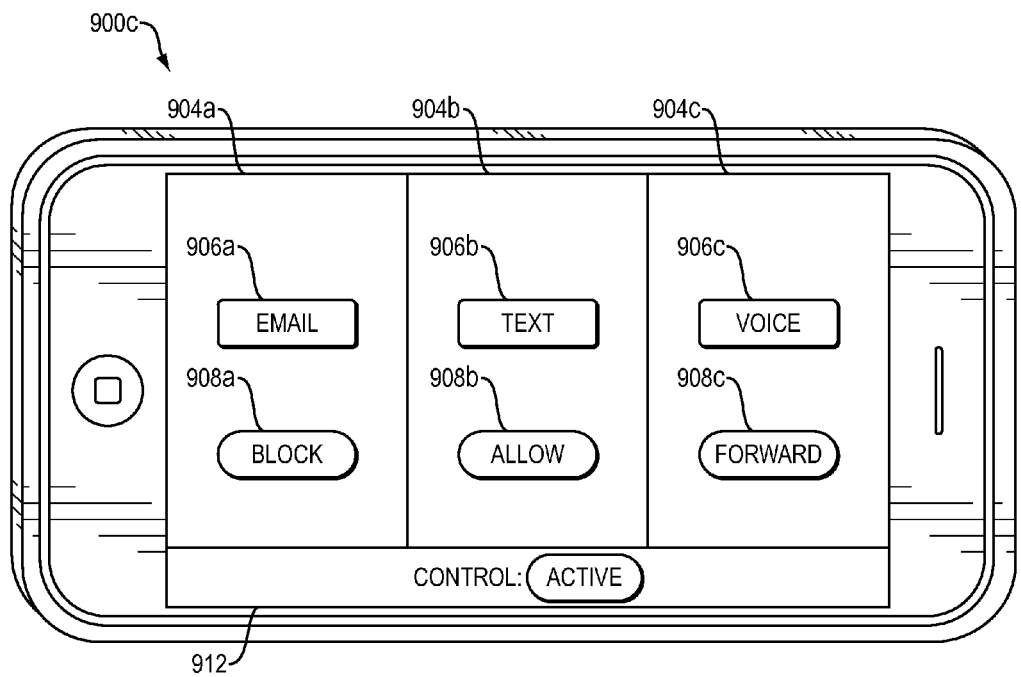

If a profile has an activation state (as in the case of FIG. 5C), such a profile may be manifested by the user interface 900*c* of FIG. 9C, which is similar to the user interface 900*a* of FIG. 9A, except that the user interface 200*c* of FIG. 9C further includes a profile activation element 912, which manifests the activation state of the corresponding profile. To modify the activation state of the corresponding profile, the user may select (e.g., click on) profile activation element 910*c*, in response to which the corresponding profile controller may toggle the value of the corresponding activation state specifier from its current value (e.g., "active") to its alternate value (e.g., "inactive").

Figure 9D:
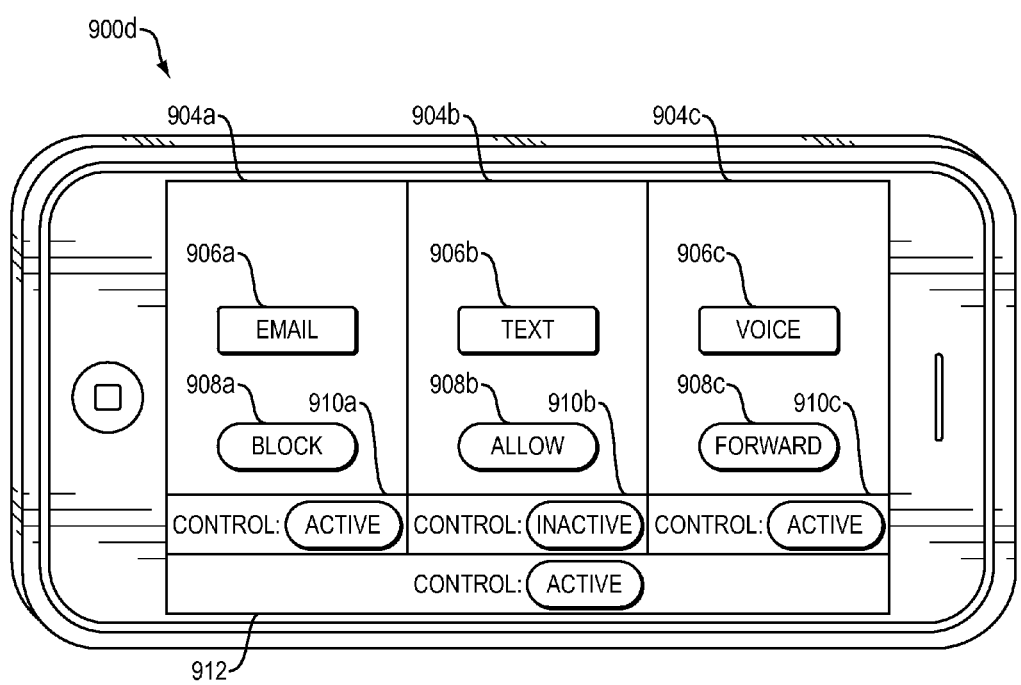

If both a profile and its associated logic modules have activation states (as in the case of FIG. 5D), such a profile and associated logic modules may be manifested by the user interface 900*d* of FIG. 9D, which combines elements of the user interfaces 900*b* (FIG. 9B) and 900*c* (FIG. 9C).

As another example, distinct profiles may have names or other unique identifiers, such as "work," "home," and "school," or "weekday" and "weekend." Embodiments of the present invention may provide user interfaces that enable a user to select a particular profile and thereby make the selected profile the active profile by selecting the profile's name, such as by selecting the name from a list or speaking the name of the profile. Such a user interface may also allow the user to select and activate/deactivate a profile by issuing a single command, such as "activate work" or "deactivate home." As yet another example, a user interface may enable a user to either deactivate all profiles or select a particular profile as the active profile by issuing a single command, e.g., by speaking a single word or phrase, or by selecting a single word or phrase from a list, where an example of such a list is: "Disable," "Home," "Work," and "Car." In this example, selecting "Disable" causes all profiles (e.g., all profiles, or all system, device, or user profiles) to be disabled, while selecting any one of "Home," "Work," and "Car" causes a corresponding profile to be selected as the active profile.

As another example, user interfaces may enable the user to select logic modules and/or to configure logic modules without the use of profiles. For example, a user interface may enable a user to select a particular combination of two or more logic profiles, such as by selecting such profiles from a list, where an example of such a list is: "Disable," "Email: Block, Text: Allow, Voice: Forward," "Email: Allow, Text: Allow: Voice: Block," and "Email: Forward, Text: Forward, Voice: Forward." In this example, selecting "Disable" causes all logic modules (e.g., all logic modules associated with a system, device, or user) to be disabled, while selecting any other entry from the list causes a corresponding combination of logic modules to be selected as the current logic modules.

Any of the techniques disclosed herein may be implemented, for example, as: (1) standalone components (e.g., hardware and/or computer programs), which may or may not interoperate with existing components (e.g., existing computing devices, existing messaging software); (2) plug-ins to existing components; or (3) integral modifications to existing components. Implementing plug-in embodiments may, for example, include installing the plug-in to the existing component using a plug-in interface provided by the existing component. Embodiments that are not implemented as integral modifications to existing components may, for example:

implement actions such as blocking messages by performing one or more of the following: (1) intercepting messages (and other input) addressed to such components and preventing such input from reaching such components; (2) intercepting messages (and other output) generated by such components and preventing such output from reaching its designated destination; (3) disabling or enabling such components, or sub-components thereof; and (4) modifying the configurations of such components, such as by using API calls; and implement actions such as allowing messages by performing one or more of the following: (1) intercepting messages (and other input) addressed to such components and forwarding such input to such components; (2) intercepting messages (and other output) generated by such components and forward such output to its designated destination; (3) enabling such components, or sub-components thereof, and then not intercepting input addressed to or output generated by such components; and (4) modifying the configurations of such components, such as by using API calls.

Embodiments of the present invention may respond in a variety of ways to changes in the activation states of profiles and logic modules. For example, if a logic module is inactive and then becomes active, the techniques disclosed herein may begin to apply the logic module to the context data 202. For example, if the condition specified by the logic module is satisfied by a particular class of messages, then the techniques disclosed herein may begin to perform the action specified by the logic module in response to detection of messages in the particular class.

It may, however, be desirable to take additional actions, or to modify the actions performed by the logic module, in anticipation of a future transition of the logic module from active to inactive. For example, if the action specified by the logic module is "block," then it may be desirable, upon a transition of the logic module from active to inactive, to "unblock" any messages that were blocked by the logic module while it was active. Such a result may be achieved by, for example, implementing a "block" action as a "defer" action, where the condition that terminates the "defer" action is the transition of the logic module from active to inactive. The "defer" action may, for example, store deferred messages in a deferral queue. Upon transition of the logic module from active to inactive, messages in the deferral queue may, for example, be delivered to their designated destination. For example, incoming messages that were prevented from being inserted into an inbox by the "defer" action may be inserted into the inbox upon transition of the logic module from active to inactive, and outgoing messages that were prevented from being transmitted to their destinations may be transmitted to their destinations upon transition of the logic module from active to inactive. More generally, in response to transition of a logic module from active to inactive, any actions that were prevented from being performed by the logic module while the logic module was active may be performed.

The same techniques may be applied in connection with changes in the activation state of a profile (e.g., a system, device, or user profile) that is associated with the logic module, assuming that the logic module is active. In other words, if a logic module is active, then the transition of a profile associated with the logic module from inactive to active may be implemented in the same way as a transition of the logic module from inactive to active, and the transition of the profile from active to inactive may be implemented in the same way as a transition of the logic module from active to inactive.

As another example, when a logic module (or associated profile) transitions from inactive to active, the state of components (such as email clients, instant messaging clients, web browsers, VoIP clients, desktop computers, laptop computers, smartphones, and tablet computers) that may be affected by the actions of the logic module may be stored. In particular, any state that is modified in response to a transition of a logic module from inactive to active may be saved before that state is modified. For example, when a logic module transitions from inactive to active, techniques disclosed herein may save the current ringer volume of a telephone before changing the ringer volume. In response to a transition of the logic module from active to inactive, such saved state may be restored to the system from which the state was saved, such as by restoring the telephone ringer volume to its saved state. As another example, when a logic module transitions from inactive to active, techniques disclosed herein may terminate an email client if the logic module specifies that transmission of email messages is to be blocked. In response to a transition of the logic module from active to inactive, such saved state may be restored by launching the email client that was terminated.

Examples of state that may be saved in response to a transition of a logic module or profile from inactive to active, and restored in response to a transition of a communication mode profile from active to inactive, include but are not limited to: ringer volume, ringer tone, automatic forwarding of voice calls to voicemail, enabled/disabled state of user interface elements (e.g., buttons, menus, and menu items), email send/receive schedule, enabled/disabled state of automatic email sending/receiving, and manifestation of receipt of messages.

As used herein, "manifesting" data refers to providing output, to a user, that represents such data. Such output may take any form, such as a visual form and/or an auditory form. For example, such output may include any one or more of the following in any combination: text, graphics, images, video, and audio. As this description makes clear, any output described herein as being "manifested," may, for example, solely include text, solely include graphics, solely include video, or solely include audio.

Having described message control profiles in general, techniques will next be described for using message control profiles to control transmission, reception, and notification of messages. First, however, the meaning of the term "communication mode" as used herein will be described.

In general, the "communication mode" of a particular message refers to any feature(s) of the method by which the message is transmitted (sent and/or received). A particular message having a particular communication mode is transmissible via the particular communication mode. For example, a message may be transmissible via a communication mode because the message is formatted in a manner that makes the message adapted for transmission via the communication mode (e.g., formatted according to a protocol for transmitting messages via the communication mode). If a message actually is transmitted via a communication mode, then the message necessarily is transmissible via the communication mode. A message need not, however, actually be transmitted via a communication mode to be transmissible via that communication mode. For example, a message that is formatted according to a protocol for transmitting messages via the communication mode is transmissible via the communication mode even if the message is deleted or otherwise blocked from being transmitted via the communication mode.

Terms such as "transmit" and "transmission" as applied to messages herein include sending and/or receiving messages.

For example, "transmitting a message" includes solely sending a message, solely receiving a message, and both sending and receiving a message. Similarly, "transmitting messages" includes solely sending messages, solely receiving messages, and a combination of sending some messages and receiving other messages. Transmitting a message may include transmitting a message from one communication device to another over a network and/or transmitting a message within one communication device, e.g., from one application executing on the communication device to another application executing on the communication device.

The following examples of communication modes are exemplary and not exhaustive.

A communication mode may be defined by reference to one or more categories of message transmission. For example, the following categories are examples of communication modes: email, text message, live voice call, fax, and voice message. Because such modes are categories, a single mode may include, for example:
- messages transmitted via multiple different messaging protocols (e.g., IMAP and POPS in the case of email messages);
- messages sent and messages received;
- messages transmitted by multiple applications; and
- messages transmitted by multiple devices.

Therefore, for example, if the communication mode specified by a particular communication mode profile is an "email" communication mode and the action associated with that communication mode profile is "block," then the message control system may apply that communication mode profile by blocking all email messages, regardless of the protocol by which they are transmitted (or attempted to be transmitted), regardless of whether they are sent or received, regardless of the application by which they are transmitted, and regardless of the device by which they are transmitted.

As another example, a communication mode may be defined by reference to one or more messaging protocols. For example, the IMAP email protocol is an example of a communication mode. Therefore, if the communication mode specified by a particular communication mode profile is "IMAP email," then the action specified by that communication mode profile will be performed only in connection with email received using the IMAP email protocol, and not, for example, email received using other email protocols. Messaging protocols that may define communication modes according to embodiments of the present invention include any messaging protocols at any layer of the OSI (Open Systems Interconnection) seven-layer model. Examples of messaging protocols that may define communication modes according to embodiments of the present invention include, but are not limited to, Ethernet, GFP (Generic Framing Procedure), OTN (Optical Transport Network), IP (Internet Protocol), TCP (Transmission Control Protocol), UDP (User Datagram Protocol), HTTP (Hypertext Transfer Protocol), IMAP (Internet Message Access Protocol), IRC (Internet Relay Chat), POP3 (Post Office Protocol Version 3), and SMTP (Simple Mail Transfer Protocol), VoIP (Voice over Internet Protocol).

As another example, a communication mode may be defined by reference to one or more messaging services, such as SMS (Short Message Service), MMS (Multimedia Messaging Service), and EMS (Enhanced Messaging Service).

As another example, a communication mode may be defined by reference to a direction of transmission (i.e., send or receive). For example, if the communication mode specified by a particular communication mode profile is "receive," then the action specified by that communication mode profile will be performed in connection with received messages but not in connection with sent messages. Note that, for example, such a "receive" communication mode may include messages in multiple categories (e.g., email messages, text messages, and voice calls), transmitted using multiple protocols, and transmitted using multiple devices.

As another example, a communication mode may be defined by reference to one or more communication accounts. For example, messages transmissible via a first email account may be transmissible via a first communication mode, messages transmissible via a second email account may be transmissible via a second communication mode, and messages transmissible via a first text messaging account may be transmissible via a third communication mode.

As another example, a communication mode may be defined by reference to one or more types of message content, such as any of the following: text, image, video, and audio. Such content types may be further divided. For example, audio content may be divided into voice and non-voice content, each of which may define a separate mode.

Similarly, a communication mode may be defined by reference to one or more types of content manifestation, by which is meant the type of content that is used to manifest a particular message. For example, a voice call that is manifested by playing the audio through a speaker is manifested using an "audio" type of content. Similarly, a text message that is converted into speech by a text-to-speech engine is also manifested using an "audio" type of content, even though the text message itself has a "text" type of content.

Similarly, a communication mode may be defined by reference to the application that generated, sent, received, and/or manifested a message. For example, a communication mode may be defined by reference to one or more named applications (e.g., Microsoft Outlook, Mozilla FireFox, Facebook), one or more application types (e.g., email client, web browser, text messaging client), and/or the installation/execution location of the application (e.g., installed locally on the user's computer or installed and executing remotely, such as in the case of cloud-based applications, such as Facebook and Twitter). The definition of such a communication mode may encompass any one or more of generating, sending, receiving, and manifesting messages. For example, a communication mode may be defined to include messages generated, sent, received, and manifested by a particular named application (e.g., Microsoft Outlook), or only to include messages received by such an application but not to messages generated, sent, or manifested by such an application.

Any of the characteristics of communication modes described above may be combined with each other in any way. For example, a communication mode may be defined by reference to a message category (e.g., email) and transmission direction (e.g., receive) to define a communication mode that encompasses "received email."

The description herein refers to "detecting" a message. Such detection may include, for example, any one or more of the following: detection of an instruction to send the message, detection of an attempt to send the message, detection of the message in the process of being sent, detection that the message has been sent, detection of a scheduled time to send the message, detection of an instruction to receive the message, detection of an attempt to receive the message, detection of the message in the process of being received, detection that the message has been received, and detection of a scheduled time to receive the message.

A "communication device" may be any device that is capable of performing any one or more of the following functions: transmitting messages, receiving messages, and providing notifications of messages. Examples of communication devices include desktop computers, laptop computers, tablet computers, cellular telephones (including smartphones), and personal digital assistants (PDAs), and combinations thereof.

Embodiments of the present invention may be applied to messages, notifications of messages, or both. A notification of a message is any output derived from a message that is intended to provide information about the message. For example, when an email client displays the subject line of an email message but not the remainder of the email message, the displayed subject line is an example of a notification of the email message. In this example, the notification is output to a user, but this is not required. Instead, for example, a notification may be transmitted between two computing devices or two computer programs. A notification of a message may contain some or all of the content of the message. A notification of a message may contain information that is derived from, but not contained within the content of the message. A notification may be manifested in any of the ways disclosed herein. Any of the actions disclosed herein may be performed on notifications. A notification may itself be a message.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more non-transitory computer-readable media, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Terms such as "computer," "computing device," and "communication device," as used herein refer, for example, to desktop computers, laptop computers, cellular telephones and smartphones, personal digital assistants (PDAs), and tablet computers.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Embodiments of the present invention have a variety of advantages. For example, the ability of modern computing devices to engage in multitasking has a variety of benefits. For example, the user of a multitasking device can use that device to perform multiple tasks, without the need to purchase or use multiple devices. The ability of a device to multitask, however, can generate interruptions and other distractions that can decrease the user's productivity in connection with the activity in which the user currently is engaged. One benefit of embodiments of the present invention is that they enable the user to focus on one activity at a time, free from interruptions and other distractions. Such embodiments may, therefore, increase the user's productivity.

Embodiments of the present invention need not, however, limit the user to using a multitasking device to perform only one task. Instead, embodiments of the present invention may limit the user to using the multitasking device to perform only one task at a time, while still allowing the user to switch from one task to another over time. As a result, the user may still obtain the benefit of a single device that is capable of performing multiple tasks by using such a device to perform those tasks sequentially. While the user is using the device to perform any particular task as part of an activity in which the user is engaged, the user may remain focused on that activity, even if the user subsequently uses the device to perform a different task.

What is claimed is:

1. A method performed by at least one computer processor, the method for use with a first device, the method comprising:
(A) determining that the first device is performing a first task, wherein the first task comprises at least one of transmitting, manifesting, and composing a first message transmissible via a first communication mode, wherein the first communication mode comprises one of an email communication mode, a text message communication mode, and a voice call communication mode, wherein the first device includes a first module for performing the first task and a second module for performing a second task, wherein the second task comprises at least one of transmitting, manifesting, and composing a second message transmissible via a second communication mode, wherein the second communication mode comprises one of the email communication mode, the text message communication mode, and the voice call communication mode,
wherein the first communication mode differs from the second communication mode;
(B) in response to the determination of (A), preventing the first device from performing the second task while the first device is performing the first task;
(C) determining that the first device is performing the second task; and
(D) in response to the determination of (C), preventing the first device from performing the first task while the first device is performing the second task.

2. The method of claim 1, wherein the first task comprises manifesting the first message, wherein the second task comprises manifesting the second message, and wherein preventing the first device from performing the second task while the first device is performing the first task comprises preventing the first device from manifesting the second message while the first device manifests the first message.

3. The method of claim 1, wherein the first task comprises manifesting the first message, wherein the second task comprises manifesting a notification of the second message, and wherein preventing the first device from performing the second task while the first device is performing the first task comprises preventing the first device from manifesting the notification of the second message while the first device manifests the first message.

4. The method of claim 1, wherein the first task comprises manifesting the first message, wherein the second task comprises composing the second message, and wherein preventing the first device from performing the second task while the first device is performing the first task comprises preventing the first device from composing the second message while the first device manifests the first message.

5. The method of claim 1, wherein the first task comprises composing the first message, wherein the second task comprises manifesting the second message, and wherein preventing the first device from performing the second task while the first device is performing the first task comprises preventing the first device from manifesting the second message while the first device composes the first message.

6. The method of claim 1, wherein the first task comprises composing the first message, wherein the second task comprises manifesting a notification of the second message, and wherein preventing the first device from performing the second task while the first device is performing the first task comprises preventing the first device from manifesting the notification of the second message while the first device composes the first message.

7. The method of claim 1, wherein the first task comprises composing the first message, wherein the second task comprises composing the second message, and wherein preventing the first device from performing the second task while the first device is performing the first task comprises preventing the first device from composing the second message while the first device composes the first message.

8. The method of claim 1, wherein (B) further comprises, in response to the determination of (A), preventing a second device from performing the second task while the first device is performing the first task, wherein the second device differs from the first device.

9. The method of claim 1:
wherein the first device further comprises a third module for performing a third task, wherein the third task comprises at least one of transmitting, manifesting, and composing a third message transmissible via a third communication mode, wherein the third communication mode comprises at least one of the email communication mode, the text message communication mode, and the voice call communication mode, wherein the third task differs from the first and second tasks; and
wherein (B) comprises, in response to the determination of (A), preventing the first device from performing the second and third tasks while the first device is performing the first task.

10. The method of claim 1, further comprising:
(E) receiving context data;
(F) determining that a predetermined condition is satisfied by the context data; and
(G) allowing the first device to perform the first task in response to determining that the predetermined condition is satisfied.

11. The method of claim 10:
wherein (E) comprises receiving output, representing a time, from a time sensor; and
wherein (F) comprises determining that the predetermined condition is satisfied by the output received from the time sensor.

12. The method of claim 1, further comprising:
(E) receiving user input; and
(F) allowing the first device to perform the first task in response to the user input.

13. The method of claim 1, wherein preventing the first device from performing the second task comprises disabling the second module.

14. A non-transitory computer-readable medium comprising computer program instructions tangibly stored on the non-transitory computer-readable medium, wherein the instructions are executable by at least one computer processor to perform a method for use with a first device, the method comprising:
(A) determining that the first device is performing a first task, wherein the first task comprises at least one of transmitting, manifesting, and composing a first message transmissible via a first communication mode, wherein the first communication mode comprises one of an email communication mode, a text message communication mode, and a voice call communication mode, wherein the first device includes a first module for performing the first task and a second module for performing a second task, wherein the second task comprises at least one of transmitting, manifesting, and composing a second message transmissible via a second communication mode, wherein the second communication mode comprises one of the email communication mode, the text message communication mode, and the voice call communication mode,
wherein the first communication mode differs from the second communication mode;
(B) in response to the determination of (A), preventing the first device from performing the second task while the first device is performing the first task;
(C) determining that the first device is performing the second task; and
(D) in response to the determination of (C), preventing the first device from performing the first task while the first device is performing the second task.

15. The non-transitory computer-readable medium of claim 14, wherein the first task comprises manifesting the first message, wherein the second task comprises manifesting the second message, and wherein preventing the first device from performing the second task while the first device is performing the first task comprises preventing the first device from manifesting the second message while the first device manifests the first message.

16. The non-transitory computer-readable medium of claim 14, wherein the first task comprises manifesting the first message, wherein the second task comprises manifesting a notification of the second message, and wherein preventing the first device from performing the second task while the first device is performing the first task comprises preventing the first device from manifesting the notification of the second message while the first device manifests the first message.

17. The non-transitory computer-readable medium of claim 14, wherein the first task comprises manifesting the first message, wherein the second task comprises composing the second message, and wherein preventing the first device from performing the second task while the first device is performing the first task comprises preventing the first device from composing the second message while the first device manifests the first message.

18. The non-transitory computer-readable medium of claim 14, wherein the first task comprises composing the first message, wherein the second task comprises manifesting the second message, and wherein preventing the first device from performing the second task while the first device is performing the first task comprises preventing the first device from manifesting the second message while the first device composes the first message.

19. The non-transitory computer-readable medium of claim 14, wherein the first task comprises composing the first message, wherein the second task comprises manifesting a notification of the second message, and wherein preventing the first device from performing the second task while the first device is performing the first task comprises preventing the first device from manifesting the notification of the second message while the first device composes the first message.

20. The non-transitory computer-readable medium of claim 14, wherein the first task comprises composing the first message, wherein the second task comprises composing the second message, and wherein preventing the first device from performing the second task while the first device is performing the first task comprises preventing the first device from composing the second message while the first device composes the first message.

21. The non-transitory computer-readable medium of claim 14, wherein (B) further comprises, in response to the determination of (A), preventing a second device from performing the second task while the first device is performing the first task, wherein the second device differs from the first device.

22. The non-transitory computer-readable medium of claim 14:
   wherein the first device further comprises a third module for performing a third task, wherein the third task comprises at least one of transmitting, manifesting, and composing a third message transmissible via a third communication mode, wherein the third communication mode comprises at least one of the email communication mode, the text message communication mode, and the voice call communication mode, wherein the third task differs from the first and second tasks; and
   wherein (B) comprises, in response to the determination of (A), preventing the first device from performing the second and third tasks while the first device is performing the first task.

23. The non-transitory computer-readable medium of claim 14, wherein the method further comprises:
   (E) receiving context data;
   (F) determining that a predetermined condition is satisfied by the context data; and
   (G) allowing the first device to perform the first task in response to determining that the predetermined condition is satisfied.

24. The non-transitory computer-readable medium of claim 23:
   wherein (E) comprises receiving output, representing a time, from a time sensor; and
   wherein (F) comprises determining that the predetermined condition is satisfied by the output received from the time sensor.

25. The non-transitory computer-readable medium of claim 14, wherein the method further comprises:
   (E) receiving user input; and
   (F) allowing the first device to perform the first task in response to the user input.

26. The non-transitory computer-readable medium of claim 14, wherein preventing the first device from performing the second task comprises disabling the second module.

* * * * *

UNITED STATES PATENT AND TRADEMARK OFFICE
CERTIFICATE OF CORRECTION

Page 1 of 1

PATENT NO.       : 9,094,352 B2
APPLICATION NO.  : 14/047208
DATED            : July 28, 2015
INVENTOR(S)      : Plotkin It is certified that error appears in the above-identified patent and that said Letters Patent is hereby corrected as shown below:

In the Drawings

In Fig. 4A, Sheet 11 of 23, for Tag "422", delete "TRIGGER TRIGGER" and insert -- TRIGGER --, therefor.

In the Specification

In Column 20, Line 45, delete "duration," and insert -- duration. --, therefor.

In Column 35, Line 21, delete "POPS" and insert -- POP3 --, therefor.

Signed and Sealed this
Third Day of May, 2016

Michelle K. Lee
*Director of the United States Patent and Trademark Office*